(12) United States Patent
Hoyler

(10) Patent No.: US 7,558,706 B1
(45) Date of Patent: Jul. 7, 2009

(54) COMPUTER-AIDED SIMULATION METHOD FOR DETERMINING THE ELECTROMAGNETIC FIELD OF A BODY

(75) Inventor: Gernot Hoyler, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 902 days.

(21) Appl. No.: 09/096,113

(22) Filed: Jun. 11, 1998

(30) Foreign Application Priority Data

Jun. 11, 1997 (DE) ................................ 197 24 718

(51) Int. Cl.
*G06F 7/60* (2006.01)
*G01R 29/12* (2006.01)

(52) U.S. Cl. .......................................... 703/2; 324/457

(58) Field of Classification Search ............ 395/500.23, 395/500.26; 703/2, 5, 6; 324/457
See application file for complete search history.

(56) References Cited

U.S. PATENT DOCUMENTS 4,973,911 A * 11/1990 Marshall ...................... 324/628
5,424,963 A * 6/1995 Turner et al. ............ 395/500.27
5,915,230 A * 6/1999 Berne et al. .................... 702/22

OTHER PUBLICATIONS

Rokhlin et al.: Scalability of the fast multipole method for the Helmholtz equation; pp. 1-8.*
Stalzer: A parallel fast multipole method for the Helmholtz equation; Parallel Processing Letters; pp. 263-274.*
Stalzer: Parallelizing the fast multipole method for the Helmholtz equation; pp. 325-330.*
Coifman et al.: The fast multipole method for the wave equation, a pedestrian prescription; IEEE Ant. & Prop. Mag.; pp. 7-12.*
Song et al.; Multilevel Fast Multipole Algorithm for Solving Combined Field Integral Equation of Electromagnetic Scattering; pp. 14-19; Micro. Opt. Tech. vol. 10, No. 1; Sep. 1995. (pp. 1-20 in CiteSeer).*
Hafner, Ch., Ersetzt das Feldberechnungsprogramm den EMV-Spezialtisten, Technische Rundschau Sep. 1991, pp. 48-51.
Sadasiva M. Raoi et al: Electromagnetic Scattering by Surfaces of Arbitrary Shape, IEEE Trans. Antennas Propagat., vol. 30, No. 3, pp. 409-418, May 1982.
Ning Yan Zhu et al Application of Curved Parametric Triagular and Quadrilateral Edge Elements in the Moment Method Solution of the EFIE, IEEE Microwave and Guided Wave Letters, vol. 3, No. 9, pp. 319-321, Sep. 1993.
Youcef Saas et al GMRES: A Generalized Minimal Residual Algorithm for Solving Nonsymmetric Linear Systems, SIAM J. Sci. Stat. Comp., vol. 7, No. 3, pp. 856-869, Jul. 1986.
V. Rokhlin: Rapid Solution of Intergral Equations of Classical Potential Theory, Journal of Computational Physics, vol. 60, pp. 187-207, 1985.
"Fast Multipole Method Solution of Three Dimensional Integral Equation," Song et al., IEEE Antennas and Propagation Society, International Symposium, 1995 Digest, pp. 1528-1531, EPO Search Report May 23, 2002.

* cited by examiner

Primary Examiner—Hugh Jones
(74) Attorney, Agent, or Firm—Schiff Hardin LLP

(57) ABSTRACT

Computer-aided simulation method for determining the electromagnetic field of a body which has a plurality of subregions and contains a plurality of charges and currents. The method makes it possible to determine the electromagnetic field of a body by dividing this body into subregions and, for the subregions, making multipole expansions which give the (total) electromagnetic field when superposed. The differential equations which arise for the subregions are presented in matrix form and are solved numerically. Applications include determination of the electromagnetic compatibility (EMV) of a body.

15 Claims, 13 Drawing Sheets

◻ observer region BG

▨ neighbouring regions NG

☐ distant regions WEG

┄┄┄

[x] global multipole expansion GMPE

[•] local multipole expansion LMPE

FIG 6
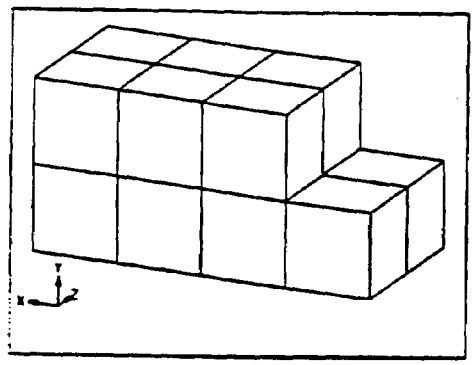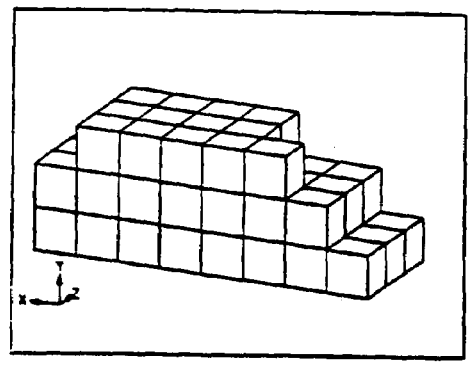
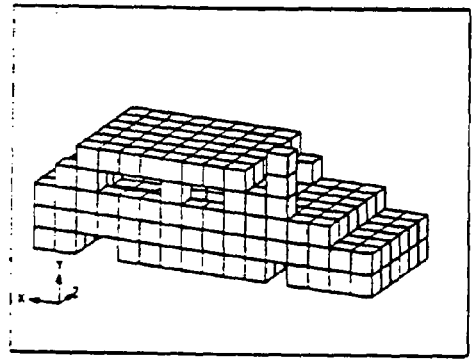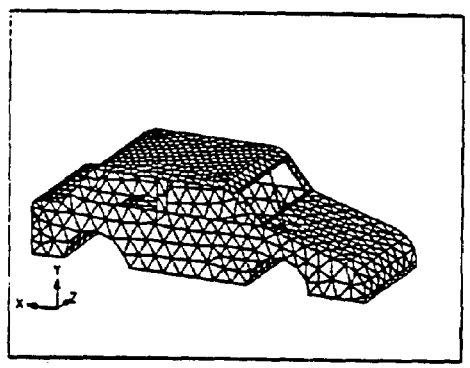

FIG 7
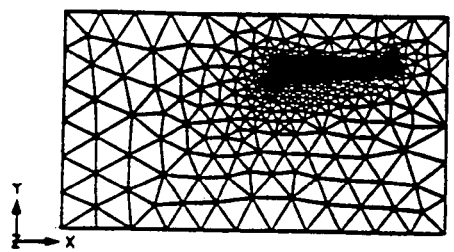
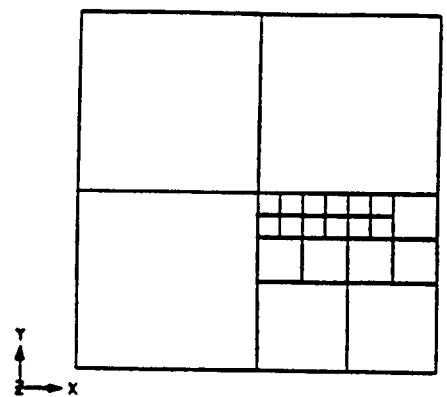

▢ observer region BG

▨ neighbouring regions NG

☐ distant regions WEG

⋯⋯

[×] global multipole expansion GMPE

[·] local multipole expansion LMPE

▢ observer region BG
▨ neighbouring regions NG
☐ distant regions WEG
······
▫ global multipole expansion GMPE
▫ local multipole expansion LMPE

COMPUTER-AIDED SIMULATION METHOD FOR DETERMINING THE ELECTROMAGNETIC FIELD OF A BODY

BACKGROUND OF THE INVENTION

The invention relates to a computer-aided simulation method for determining the electromagnetic field of a body which comprises a plurality of subregions and contains a plurality of charges and currents.

DIN standard VDE 0870 describes the "electromagnetic compatibility" (EMV) of an electrical device as the "capacity of an electrical device to function satisfactorily in its electromagnetic environment without unacceptably affecting this environment, which is shared by other devices".

An algorithm which belongs to the CG (conjugate gradient) method class and is referred to as the GMRES method, is disclosed by "Youcef Saas and Martin H. Schultz: GMRES: A Generalized Minimal Residual Algorithm for Solving Nonsymmetric Linear Systems. SIAM J. Sci. Stat. Comp., Vol. 7, No. 3, pp. 856-869, July 1986".

The fast multipole method (FMM) is disclosed, for example, by "V. Rokhlin: Rapid Solution of Integral Equations of Classical Potential Theory. Journal of Computational Physics, Vol. 60, pp. 187-207, 1985." One essential disadvantage with this formalism is due to the property that the multipole coefficients are not calculated explicitly, which may result in spurious distortions that in turn lead to errors in the multipole expansions.

SUMMARY OF THE INVENTION

The object of the invention is to determine the electromagnetic field of a body using a computer, so that electromagnetic compatibility of the body can be ensured actually before it is made, and thus to avoid optimization cycles consisting of measurements and retrospective improvements, the above-mentioned disadvantages being avoided.

In general terms, the present invention is a computer-aided simulation method for determining the electromagnetic field of a body which has a plurality of subregions and contains a plurality of charges and currents. In each of the plurality of subregions, a global multipole expansion is made which represents the effect of the charges and currents for distant points in the form of a multipole expansion, and a local multipole expansion is made, which represents the effect of the charges and currents at points inside this one of the plurality of subregions in the form of a multipole expansion. The electromagnetic field of the body is determined by superposition using the global multipole expansion and the local multipole expansion for the plurality of subregions.

Advantageous developments of the present invention are as follows.

The following steps for determining the electromagnetic field of the body are carried out iteratively until the error measure is of a predeterminable small size, I=0 being taken as an initial condition:

a) calculating the global multipole expansions with global multipole coefficients according to
$c^g = GI$,
$c^g$ being a vector made up of the global multipole coefficients of the plurality of subregions,
I being a vector which specifies a given current distribution,
G being a matrix determining the global multipole coefficients in the relevant subregion of the plurality of subregions for the given current distribution I;

b) calculating the local multipole expansion with local multiple coefficients according to
$c^l = Tc^g$,
$c^l$ being a vector made up of the local multipole coefficients of the plurality of subregions,
T being a translation matrix through which the global multipoles are combined into local multipoles;

c) determining the electromagnetic field from $ZI = Z'I + Lc^l$,
Z denoting an impedance matrix,
Z' denoting a part of the impedance matrix Z, representing couplings between the subregions,
L denoting a matrix for evaluating the local multipole coefficients.

In one embodiment, the subregions are of equal size.

The size of the subregions are proportional to the distance from an observer region.

The relevant subregion of the plurality of subregions is in each case assigned to a zone with uniform physical attribute.

In a refinement step, the subregion of the plurality of subregions is split into up to eight zones.

An element which has an impedance and is a component of the subregion of the body is taken into account directly in the matrix Z' as an impedance.

The electromagnetic field is determined for predeterminable frequencies.

The predeterminable frequencies are determined by a minimum frequency and by a maximum frequency, the method being started at the minimum frequency and the electromagnetic field being in each case determined, continuing as far as the maximum frequency, with a predeterminable step size.

The predeterminable frequencies are determined by a minimum frequency and by a maximum frequency, the method being started at the maximum frequency and the electromagnetic field being in each case determined, continuing as far as the minimum frequency, with a predeterminable step size.

The predeterminable frequencies are determined by a minimum frequency and by a maximum frequency, the method being started at a frequency between the minimum frequency and the maximum frequency, and the electromagnetic field being in each case determined, continuing as far as the maximum frequency or as far as the minimum frequency, with a predeterminable step size.

Stability at low frequencies is ensured by carrying out the global multipole expansions by elements instead of using basis functions.

The electromagnetic compatibility of the body is determined.

In a computer-aided simulation method, the electromagnetic field of a body which comprises a plurality of subregions and contains a plurality of charges—pole expansion and a local multipole expansion are made in the subregions, a global multipole expansion representing the effect of the charges and currents for distant points in the form of a multipole expansion and, in similar fashion, a local multipole expansion representing the effect of the charges and currents at points inside one of the plurality of subregions in the form of a multipole expansion. Global multipole coefficients are calculated as parameters of the global multipole expansion, and local multipole coefficients are calculated as parameters of the local multipole expansion. Finally, the electromagnetic field of the body is determined from the global and local multipole expansions.

Simulating the prescribed measurements needed for EMV by using numerical methods substantially facilitates optimization of the product components. The repeated process of measurement and retrospective improvement, the simulated measurement being possible at all points, and therefore associated costs and time fan be substantially reduced with the method according to the invention.

The method proposed here is suitable, in particular, for simulating scattering problems, in which the geometrical structures of the models, and therefore the dimensions of the subregions as well, are smaller than the wavelength. Under such conditions, the interference effects remain limited, so that just a few multipole coefficients are enough to describe potentials or field strengths. With the stabilization method described here, the method is stable even for low frequencies.

A first development of the invention consists in dividing the body into at least one further subregion. The body therefore consists of subregions.

A further development consists in carrying out the following steps for determining the electromagnetic field iteratively with an initial condition I=0 until a truncation condition which gives an error measure sufficiently small size.

A subsequent development consists in choosing subregions of equal size.

In a development, the size of the subregions is chosen to be proportional to the distance from an observer region.

Yet another development consists in respectively assigning a subregion to a zone with uniform physical attribute. This may, for example, involve large surfaces with an equal electromagnetic property, for example equal charge distribution, or the like.

In the context of another development, components which have an impedance and lie inside the body in question are taken into account directly as an impedance in the matrix Z'.

The electromagnetic field may furthermore be determined for predeterminable frequencies.

An additional development consists in choosing the predeterminable frequencies from a lowest frequency to be examined up to a highest frequency to be examined, continuously with a predeterminable step size, in order to determine the electromagnetic field. In this case, it is possible to start with the lowest frequency to be examined and continue to the highest frequency to be examined, or vice versa. It is also possible to start between the lowest and highest frequencies to be examined, the method for determining the electromagnetic field being continued to the lowest or to the highest frequency.

An additional development consists in ensuring the stability of the method at low frequencies by carrying out the global multipole expansions by elements instead of using basis functions.

One development consists in using the method to determine the electromagnetic compatibility of a body.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

FIG. 6 shows the division of the bodywork of a car into subregions for the refinement stages 2, 3, and 4;

FIG. 7 shows the division into subregions in the case of varying element sizes;

FIG. 8 shows a sketch representing the spherical coordinates r, E, a;

DESCRIPTION OF THE PREFERRED EMBODIMENTS

Figure 1:
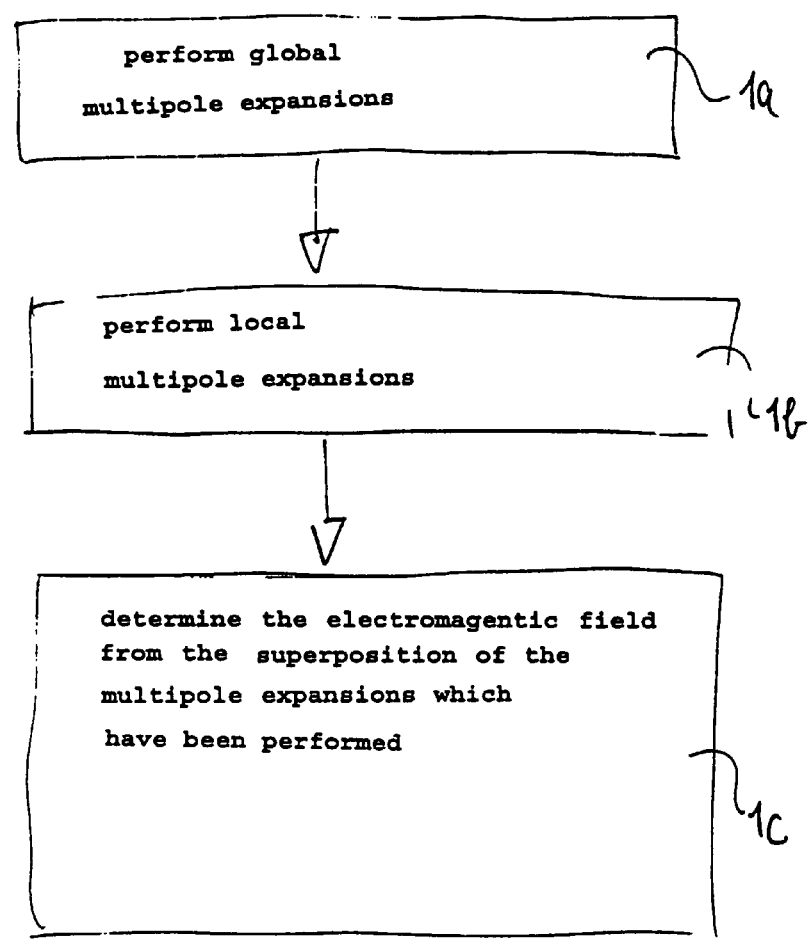
FIG. 1 shows a block diagram showing the steps of a method for determining the electromagnetic field of a body.

The invention will firstly be explained in more detail with reference to FIGS. 2 to 13.

The Retarded Potentials

The Maxwell equations in differential form, as are sufficiently well-known to the person skilled in the art, will be used as a starting point:

$$\nabla \cdot E = \frac{\rho}{\varepsilon_0} \tag{1a}$$

$$\nabla \times E = -i\omega\mu_0 H \tag{1b}$$

$$\nabla \cdot H = 0 \tag{1c}$$

$$\nabla \times H = J + i\omega\varepsilon_0 E \tag{1d}$$

$\nabla$ denoting the del operator,

H denoting the magnetic field strength,

E denoting the electric field strength, $\rho$ denoting the space charge density, $\varepsilon_0$ denoting the permittivity of a vacuum, i denoting an imaginary number ($\sqrt{-1}$), $\omega$ denoting the angular frequency, $\mu_0$ denoting the permeability of a vacuum, J denoting the volume current density.

A continuity equation follows directly from the Maxwell equations by combining equation (1a) with divergence of equation (1d):

$$\nabla \cdot J = -1\omega\rho \tag{2}$$

If the potentials are set up as follows $$E = -i\omega\lambda - \nabla\phi \tag{3a}$$

$$H = \frac{1}{\mu_c} \nabla \times \lambda \tag{3b}$$

then, taking into account the Lorentz condition $$\nabla \cdot A + i\omega\epsilon_0\mu_0\phi = 0 \tag{4}$$

this gives the two differential equations:

$$(\nabla^2 + k^2)A = -\mu_0 J \tag{5a}$$

and $$(\nabla^2 + k^2)\varphi = -\frac{\rho}{\varepsilon_0} \tag{5b}$$

with the wave number $$k = \omega\sqrt{\varepsilon_0\mu_0} = \frac{\omega}{c_0} = \frac{2\pi}{\lambda}, \tag{6}$$

whereby

A denoting a magnetic vector potential,
$\phi$ denoting an electric scalar potential,
$c_0$ denoting the velocity of light in a vacuum,
$\lambda$ denoting the wavelength.

Both the scalar electric potential ø and the three Cartesian components of the magnetic vector potential A are described by the same type of differential equation which, amongst other things, is termed the Helmholtz equation:

$$(\nabla^2 + k^2)\psi(r) = f(r) \tag{7}$$

$\psi$ denoting a basis function, r denoting a position vector, f( ) denoting the function of an argument.

If the solution of the Helmholtz equation is known for a Dirac-function excitation on the right-hand side, then the total solution for a given function f(r) can be determined through superposition. On symmetry grounds, a Dirac-function excitation at the origin gives rise to a spherically symmetric solution function $\psi$, so that equation (7) in spherical coordinates can be reduced to the following differential equation as a function of r.

$$\frac{1}{r^2}\frac{\partial}{\partial r}r^2\frac{\partial}{\partial r}\psi + k^2\psi^2 = 0 \tag{8}$$

If the substitution $$\tilde{\psi} = r\psi$$

is made in equation (8), this results in an ordinary differential equation with constant coefficients:

$$\tilde{\psi}'' + k^2\tilde{\psi} = 0 \tag{9}$$

with the general solution:

$$\tilde{\psi} = C_1 e^{-ikr} + C_2 e^{ikr} \tag{10}$$

or $$\psi = C_1 \frac{e^{-ikr}}{r} + C_2 \frac{e^{ikr}}{r}. \tag{11}$$

The first term in equation (11) describes an emergent wave, and the second term an incident wave. Since the latter is ruled out on physical grounds, all that remains is to determine the constant $C_1$. For the electric scalar potential $\phi$, this is given as follows by comparing the general solution with the electrostatic potential (k→0) of a charge element relative to ρdV located at the origin:

$$C_1^{el} = \frac{1}{4\pi\varepsilon_0}\rho dV \tag{12}$$

Similarly, the constant for the magnetic vector potential of a current element JdV located at the origin is given as:

$$C_2^{mag} = \frac{\mu_0}{4\pi}JdV. \tag{13}$$

Through integration over all the source regions G, the solutions of equations (5a) and (5b) are finally given as:

$$A(r) = \frac{\mu_0}{4\pi}\int\int_G\int J(r')\frac{e^{-ikR}}{R}dV' \tag{14a}$$

$$\varphi(r) = \frac{1}{4\pi\varepsilon_0}\int\int_G\int \rho(r')\frac{e^{-ikR}}{R}dV', \tag{14b}$$

with: R=∥r−r'∥ whereby

R denoting the distance between an observer point r and a source point r',

G denoting a volume region,

A, $\phi$ denoting retarded potentials.

Calculation of the Field Strengths

Substituting equation (14a) in (3a) and equation (14b) in (3b) makes it possible to determine the electric field strength and the magnetic field strength:

$$E(r) = \tag{15a}$$
$$-\frac{i\omega\mu_0}{4\pi}\int\int_G\int J(r')\frac{e^{-ikR}}{R}dV' - \frac{1}{4\pi\varepsilon_0}\int\int_G\int \rho(r')\nabla\frac{e^{-ikR}}{R}dV'$$

$$H(r) = \frac{1}{4\pi}\int\int_G\int \nabla\frac{e^{-ikR}}{R} \times J(r')dV' \tag{15b}$$

Using spherical coordinates gives the following:

$$\nabla\frac{e^{-ikR}}{R} = -e^{-ikR}\left(\frac{1}{R^3} + \frac{ik}{R^2}\right)R. \tag{16}$$

The integral formulae for determining the electric and magnetic field strengths for given sources are given as:

$$E(r) = -\frac{i\omega\mu_0}{4\pi}\int\int_G\int J(r')\frac{e^{-ikR}}{R}dV' + \frac{1}{4\pi\varepsilon_0}\int\int_G\int \rho(r')e^{-ikR}\left(\frac{1}{R^3}+\frac{ik}{R^2}\right)R\,dV' \quad (17a)$$

$$H(r) = \frac{1}{4\pi}\int\int_G\int e^{-ikR}\left(\frac{1}{R^3}+\frac{ik}{R^2}\right)J(r')\times R\,dV' \quad (17b)$$

Equation (17b) can be regarded as an extension of the Biot-Savart law for the temporally harmonic case.

Perfect Conductor in an External Magnetic Field

Figure 2:
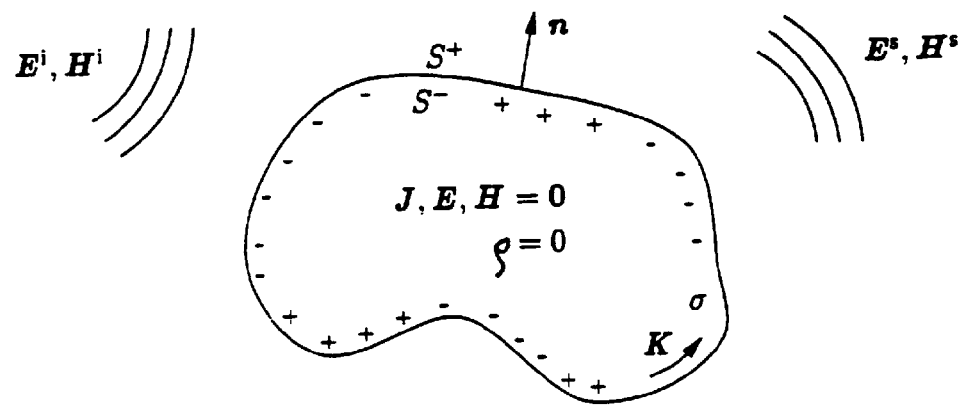
FIG. 2 shows a perfectly conducting body in an external field.

If a perfectly conducting body is placed in an external incident field $E^i$, $H^i$, then a current and charge distribution K, σ is formed on the surface S of the perfectly conducting body, such that the interior of the body is free of any field (see FIG. 2). The field produced by the induced sources K, σ is referred to as the scattered field $E^s$, $H^s$. It can be calculated using equations (17a) and (17b) and is superposed with the incident field $E^i$, $H^i$. Since the total field $$E = E^i + E^s \quad (18)$$

$$H = H^i + H^s \quad (19)$$

vanishes inside a perfect conductor, the boundary conditions on the inside of the conductor surface $S^-$ are given as:

$$E_{tan} = 0 \text{ for } r \in S^- \quad (20a)$$

$$H_{tan} = 0 \text{ for } r \in S^- \quad (20b).$$

There is a discontinuity in $H_{tan}$ on crossing the boundary face, and the following are satisfied for the outside of the conductor surface $S^+$:

$$E_{tan} = 0 \text{ for } r \in S^+ \quad (21a)$$

$$E_{tan} = K \times n \text{ for } r \in S^+ \quad (21b).$$

In this case, the surface current density K is related to the surface charge density σ through the two-dimensional continuity equation $$\nabla_S \cdot K = -i\omega\sigma \quad (22)$$

The expression $\nabla_s \cdot K$ denotes the two-dimensional divergence of the surface current density K in the boundary face S.

If there are a plurality of perfectly conducting bodies in the incident field, then the boundary face S is composed of different subfaces $S_k$, i.e.

$$S = \bigcup_k S_k. \quad (23)$$

The scattered field $E^s$, $H^s$ then comprises all the subfields originating from the individual bodies, and the boundary conditions according to equation (20a), (20b), (21a) and (21b) are satisfied for all the conductor surfaces.

The object of a scattering problem then consists, for given incident fields $E^i$, $H^i$ and while satisfying the boundary conditions (20a, b), (21a,b), to find the current and charge distribution K, σ on the surfaces of the conductor.

The term "current distribution" will be used below to denote a coupled current and charge distribution, without explicitly referring to the charge distribution. It can at any time be derived using equation (22) and can therefore be subordinated to the term "current distribution".

For the field outside the perfectly conducting body, a classical uniqueness theorem can be applied:

The field distribution in a closed volume region G is uniquely specified by the sources which it contains and by the behavior of $E_{tan}$ or $H_{tan}$ at the boundary of the volume region G.

As regards the uniqueness of the scattering problems in question, it is sufficient to satisfy one of the boundary conditions in equations (20a,b) or (21a,b).

Evaluation of $E_{tan}$ by combining equation (18) with equation (20a) gives $$-n \times E^s = n \times E^i \text{ for } r \in S \quad (24)$$

Since $E_{tan}$ is continuous on crossing the boundary faces, it is in this case unimportant whether the relationship is evaluated on the outside of the conductor surface $S^+$ or on the inside of the conductor surface $S^-$. The scattered field $E^s$ can be determined using equation (17a). If, furthermore, the surface charge density σ is expressed through the surface current density K by using the continuity equation (22), this gives the integral equation for the electric field in integrodifferential form:

$$n \times \int\int_S \frac{e^{-ikR}}{4\pi}\left[\frac{i\omega\mu_0 K(r')}{R} + \frac{\nabla_S' \cdot K(r')}{i\omega\varepsilon_0}\left(\frac{1}{R^3}+\frac{ik}{R^2}\right)R\right]da' = n \times E^i(r) \quad (25)$$

for $r \in S$.

Evaluating the tangential magnetic field strength $H_{tan}$ by combining equation (19) with equation (20b) or equation (21b) leads to the relationships $$-n \times H^s = n \times H^i \text{ for } r \in S^- \quad (26a)$$

$$K - n \times H^s = n \times H^i \text{ for } r \in S^+ \quad (26b).$$

Unlike in equation (24), it is here necessary to take into account the side of the face S where the observer point r lies. In order to achieve an integral equation independent of this, the discontinuous behavior of $H_{tan}$ on crossing the face S must be considered in more detail.

This finally gives the integral equation for the magnetic field of a perfectly conducting body with smooth surfaces:

$$\frac{1}{2}K(r) - n \times \int\int_S \frac{e^{-ikR}}{4\pi}\left(\frac{1}{R^3}+\frac{ik}{R^2}\right)K(r') \times R\,da' = n \times H^i(r) \quad (27)$$

for $r \in S$

Since use of the integral equation (27) for magnetic fields is, amongst other things, restricted to bodies with smooth surfaces and large radii of curvature, the integral equation for electric fields will henceforth be used as the basis in the present invention. This being the case, instead of resorting to equation (25), a slightly modified formulation of equation (25) will be used:

$$n \times \left[\frac{i\omega\mu_0}{4\pi}\int\int_S \frac{e^{-ikR}}{R}K(r')da' - \right. \quad (28)$$

$$\left.\frac{1}{i\omega 4\pi\varepsilon_0}\nabla\int\int_S\frac{e^{-ikR}}{R}\nabla'_S\cdot K(r')da'\right]=n\times E^i(r)$$

for $r\in S$     (5)

Solution of the four Maxwell equations while satisfying the boundary conditions (20a,b), (21a,b) thus reduces to analyzing the integral equation (28). The solution function sought here is the current distribution K(r) on the surfaces of the body in question.

Vector Basis Functions

Taking into account the continuity equation (22) gives the following for the current distribution K, σ:

$$K(r)=\sum_{n=1}^{N}\alpha_n\bar{\psi}_n(r) \quad (29a)$$

$$\sigma(r)=-\frac{1}{i\omega}\sum_{n=1}^{N}\alpha_n\nabla_S\cdot\bar{\psi}_n(r) \quad (29b)$$

whereby $\bar{\psi}$ denoting a vector basis function, $\nabla_s$ denoting a two-dimensional del operator in the face S, $\alpha_n$ denoting a moment (scalar coefficient), N denoting the number of basis functions, n denoting a numerical variable.

The use of vector basis functions on triangular elements is known from "Sadasiva M. Raoi, Donald R. Wilton, Allen W. Glisson: Electromagnetic Scattering by Surfaces of Arbitrary Shape. IEEE Trans. Antennas Propagat., Vol. 30, No. 3, pp. 409-418, May 1982. "Ning Yan Zhu and Friedrich M. Landstofer: Application of Curved Parametric Triangular and Quadrilateral Edge Elements in the Moment Method Solution of the EFIE. IEEE Microwave and Guided Wave Letters, Vol. 3, No. 9, pp. 319-321, September 1993, presents vector basis functions for parametric elements. It includes the idea of using a linear surface current distribution to achieve a piecewise constant charge distribution. Since first-order vector basis functions extend over two neighboring surface elements, up to two basis functions interact per cylinder element, up to three per triangular element and up to four per rectangular element. A rule for the assignment of basis functions to surface elements is as follows:

One basis function and therefore one degree of freedom of the resulting system of equations corresponds to each inner edge of a discretization grid.

As a rule, first-order vector basis functions have the following properties:
  a) The resulting surface current density K is continuous.
  b) The resulting surface charge density σ is piecewise constant.
  c) $K_\perp=0$ at the boundary of the definition region of a basis function.
  d) Each basis function satisfies the continuity equation (22) individually.
  e) No singular charges occur, as are unavoidable with zero-order basis functions.
  f) Each basis function can, at a large distance, be regarded as a Hertzian dipole.

Line Weighting Method

In the line weighting method, the boundary condition $E_{tan}=0$ is written in the form of a line integral $$\int_{C_m}E\cdot dr=0 \quad (30)$$

Figure 3:
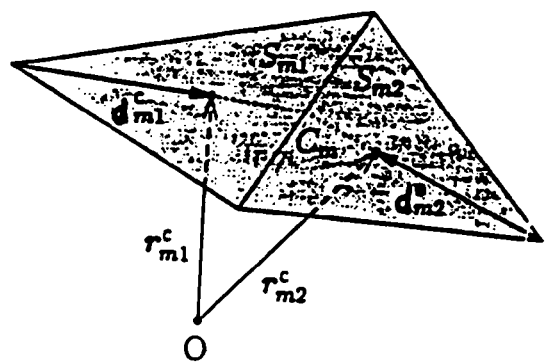
FIG. 3 shows geometrical dimensions for a line weighting method.

In this case, the curve $C_m$ relates to the m-th element pair, consisting of the elements $S_{m1}$, $S_{m2}$, and extends in a straight line from the centroid of the first element $r_{m1}{}^c$ to the middle of the common edge and then on in a straight line to the centroid of the second element $r_{m2}{}^c$ (see FIG. 3).

The idea with the line weighting method consists in converging the act of taking the gradient of the scalar potential φ through a line integral into a discrete potential different. The starting point is the integral equation for the electric field (28)

$$(i\omega A+\nabla\phi)_{tan}=E_{tan}{}^i \text{ for } r\epsilon S \quad (31)$$

with the potentials $$A=\frac{\mu_0}{4\pi}\int\int_S\frac{e^{-ikR}}{R}K(r')da' \quad (32a)$$

$$\varphi=-\frac{1}{i\omega\varepsilon_0 4\pi}\int\int_S\frac{e^{-ikR}}{R}\nabla'_S\cdot K(r')da' \quad (32b)$$

If both sides of equation (31) are weighted vectorially over the M curves $C_m$ then this gives the equations $$\int_{C_m}(i\omega A+\nabla\varphi)\cdot dr=\int_{C_m}E^i\cdot dr \quad mit\, m=1,2,\ldots,M \quad (33)$$

The integration for $\nabla\phi$ which is involved here can now be replaced by the potential difference between the two end points. If $E^i$ and A are furthermore taken to first approximation as constant within a surface element, then for triangular elements this gives:

$$i\omega\left[A(r_{m1}^c)\frac{d_{m1}^c}{2}-A(r_{m2}^c)\frac{d_{m2}^c}{2}\right]+\varphi(r_{m2}^c)-\varphi(r_{m1}^c)= \quad (34)$$

$$E^i(r_{m1}^c)\frac{d_{m1}^c}{2}-E^i(r_{m2}^c)\frac{d_{m2}^c}{2}$$

with m=1, 2, . . . , M.

The two local position vectors $d_{m1}{}^c$ and $d_{m2}{}^c$ are represented in FIG. 3.

One advantage of the line weighting method consists in circumventing the pronounced singularities from equation (25), which significantly simplifies the calculation.

Setting Up the Linear Equation System

The following relationships are obtained for the potentials from equation (32a) and equation (32b) by using equation (29a) and equation (29b)

$$A(r)=\frac{\mu_0}{4\pi}\sum_{n=1}^{N}\alpha_n\int\int_{S_n}\frac{e^{-ikR}}{R}\bar{\psi}_n(r')da' \quad (35a)$$

-continued $$\varphi(r) = -\frac{1}{i\omega\varepsilon_0 4\pi} \sum_{n=1}^{N} \alpha_n \int\int_{S_n} \frac{e^{-ikR}}{R} \nabla'_s \cdot \overline{\psi}_n(r') da' \text{ with} \quad (35b)$$

$$S_n := S_{n1} \cup S_{n2}.$$

Thus, and using the relationship $I_n = \alpha_n$, equation (34) can be represented as a matrix equation of the form $$Z \cdot I = U \quad (36)$$

In this case, the matrix $Z = [Z_{mn}]$ denotes an impedance matrix, since it relates the current strengths $I = [I_n]$ to the values $U = [U_m]$. Similarly, the inverse matrix $Z^{-1}$ is referred to as an admittance matrix.

The required moments $I_n$ can be determined by direct or iterative solution of the equation system (36).

Figure 4:
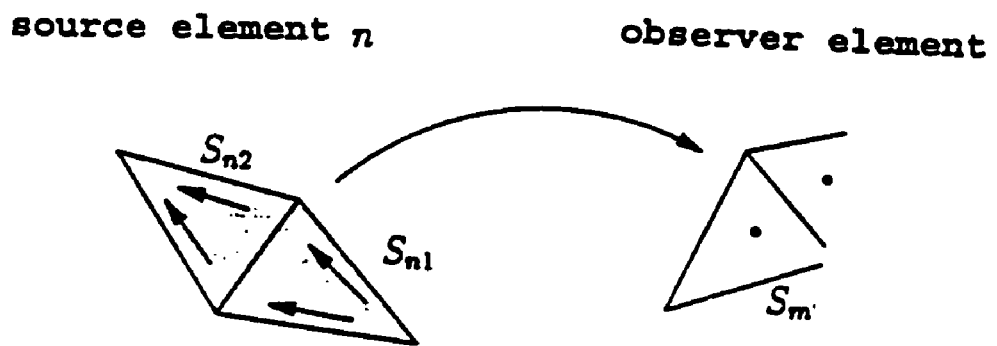
FIG. 4 shows the effect of an n-th element pair on an m-th element pair.

After the surface S has been split into the two element surfaces $S_{n1}$ and $S_{n2}$, equation (34) gives the following for the matrix element $Z_{mn}$:

$$z_{mn} = i\omega\left[(A_{11} + A_{21})\frac{d^c_{m1}}{2} - (A_{12} + A_{22})\frac{d^c_{m2}}{2}\right] + \varphi_{12} + \varphi_{22} - \varphi_{11} - \varphi_{21} \quad (37)$$

whereby $$A_{pq} = \frac{\mu_0}{4\pi} \int\int_{S_{np}} \frac{e^{-ikR_q}}{R_q} \overline{\psi}_n(r') da' \quad (38a)$$

$$\varphi_{pq} = -\frac{1}{i\omega\varepsilon_0 4\pi} \int\int_{S_{np}} \frac{e^{-ikR_q}}{R_q} \nabla'_s \cdot \overline{\psi}_n(r') da' \quad (38b)$$

denote the individual contributions to the potential. The matrix element $Z_{mn}$, also referred to as a coupling impedance, describes the effect of the n-th element pair on the m-th element pair. FIG. 4 represents coupling paths between a source element n and an observer element m. For example, $A_{21}$ denotes the vector potential produced by $S_{n2}$ at the center of $S_{m1}$.

One programmed approach for calculating the impedance matrix $[Z_{mn}]$ consists in separate complete evaluation of the individual terms $Z_{mn}$ according to equation (37). Since, however, up to three basis functions per element are involved in the case of triangular elements, another idea would be to calculate the impedance matrix $Z_{mn}$ in stages. To this end, the partial results according to equation (38a) and equation (38b) are respectively calculated for two triangular elements and, after having been provided with suitable factors, are added to the relevant matrix elements.

The right-hand side of the equation system (36) is calculated as follows according to equation (34):

$$U_m = E^i(r^c_{m1})\frac{d^c_{m1}}{2} - E^i(r^c_{m2})\frac{d^c_{m2}}{2}. \quad (39)$$

For an incident plane wave with k as propagation vector and $E_0$ as polarization direction, $E^i$ can be determined by means of the relationship $$E^i(r) = E_0 \cdot e^{-ik \cdot r} \quad (40)$$

Elements which have Impedance

If thin layers are modeled using simple surfaces, then it is also possible for imperfect conductors with surfaces exhibiting resistance, inductance or capacitance to be incorporated quite straightforwardly in the existing equation system. For conductors of this type, the appropriate boundary condition changes from $E_{tan} = 0$ to $$E_{tan} = z_s \cdot K \quad (41)$$

Because of the skin effect, the surface impedance $z_s$ is, amongst other things, dependent on a frequency. However, for layers whose thickness $l_d$ is small compared to the skin depth at the frequency in question, the current distribution can be assumed to be constant over the cross-section. For example, the surface impedance $z_s$ of a resistive metal layer at low frequencies can thus be calculated approximately through the relationship $$z_s \approx \frac{r_{sp}}{l_d} \quad (42)$$

$r_{sp}$ denoting the resistivity of the metal which is used.

Owing to the new boundary conditions (see equation (41)), the weighting integral also changes, from equation (30) to $$\int_{C_m} E \cdot dr = \int_{C_m} z_s K \cdot dr \quad (43)$$

with the quantities occurring on the right-hand side in equation (43) to be treated in the form of correction terms in the equation system.

Figure 5A:
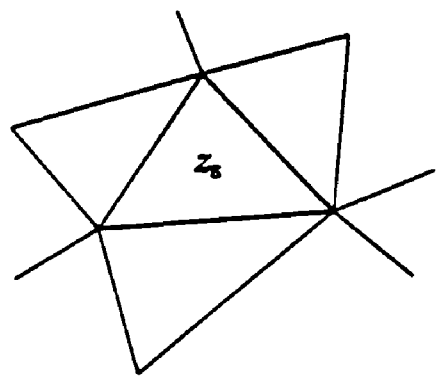
FIG. 5a shows a distributed impedance for elements which have impedance.

FIG. 5a shows distributed impedances, involving weighting integrals relating to the entire surface element, here represented by the surface impedance $z_s$. The correction term (i.e. the right-hand side of equation (43)) is $$\int_{C_m} z_s K \cdot dr = \sum_n I_n \int_{C_m} z_s \overline{\psi}n \cdot dr \quad (44)$$

so that, as a rule, up to nine matrix entries in equation (36) need to be corrected per triangular element, and as a rule up to 16 per rectangular element.

Figure 5B:
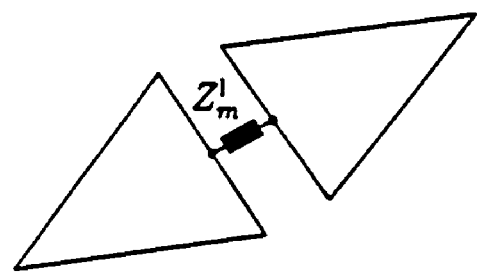
FIG. 5b shows a concentrated impedance for elements which have impedance.

It is simpler to treat concentrated impedances in the form of components, as represented in FIG. 5b. In contrast to distributed impedances (see FIG. 5a), concentrated impedances can be represented by a single edge having an impedance. Only a single weighting integral and therefore only a single row in the equation system (36) are affected. The m-th edge affected by the impedance $z_m^l$ has the following expression $$\sum_{n=1}^{N} Z_{mn} I_n = U_m - Z_m^l I_m \quad (45)$$

the value $Z_{mn}$ being defined in equation (37) and the value $U_m$ being defined in equation (39). After the additional term has been taken over to the left-hand side, this can be treated in the form of a corrected diagonal element $$\overline{Z}_{mm} = Z_{mm} + Z_m^l \quad (46)$$

Concentrated Voltage Sources

In similar fashion to the case of concentrated impedances, a single row of the equation system (36) is effected for concentrated voltage sources as well:

$$\sum_{n=1}^{N} Z_{mn} I_n = U_m - U_m^l. \quad (47)$$

The additional voltage source $U_m^l$ can be taken over unchanged to the right-hand side of the equation system (36), which gives the following relationship:

$$\tilde{U}_m = U_m - U_m^l \quad (48).$$

The Relevance of Symmetry

If the arrangement is a symmetric one, then the task of solving the equation system can be reduced considerably. In the case of a mirror-symmetric arrangement and symmetric excitation $U_m$, the number of degrees of freedom can be reduced by half. If, however, the excitations are asymmetric, then the excitation vector is split into a symmetric part and an asymmetric part.

The proposed method can also be used to deal with perfectly conducting half-planes.

In the field of EMV simulation, considerations of this type can be used, for example, to take account of the metallic floors in the measurement rooms, without increasing the number of degrees of freedom.

Numeric Evaluation of the Integrals

In order to calculate the impedance matrix, it is necessary to evaluate the integrals from equations (38a) and (38b) suitably. If the source point and the observer point are far enough away from one another, then it is sufficient to evaluate the integrals fully using numerical integration formulae. In cases when the source point and observer point are close to one another, problems arise, however, from the singularity of the integrands, so special analytical methods are used for this.

The integrals which occur in equations (38a) and (38b) of the type $$\iint_S d \frac{e^{-ikR}}{R} da' \quad (49a)$$

$$\iint_S \frac{e^{-ikR}}{R} da' \quad (49b)$$

have, for R=0 or r=r', a weak singularity which can be split off and integrated analytically. The element surface over which the integration extends is in this case quite generally referred to as S.

After some rearrangement, the integral from equation (49a) becomes:

$$\iint_S d \frac{e^{-ikR}}{R} da' = \quad (50a)$$

-continued $$\underbrace{\iint_S (\tilde{r}' - \tilde{r}) \frac{e^{-ikR} - 1}{R} da'}_{IG_1} + (\tilde{r} - \tilde{r}^f) \cdot \underbrace{\iint_S \frac{e^{-ikR} - 1}{R} da'}_{IG_2} +$$

$$\underbrace{\iint_S \frac{(\tilde{r}' - \tilde{r})}{R} da'}_{IG_3} + (\tilde{r} - \tilde{r}^f) \cdot \underbrace{\iint_S \frac{1}{R} da'}_{IG_4},$$

whereby
$r^f$ denotes the free corner of the respective element (preferably triangle),
$\tilde{r}$ denotes a vector projected into the plane of the triangle (indicated by the tilde).

A similar rearrangement is found for the integral from equation (49b)

$$\iint_S \frac{e^{-ikR}}{R} da' = \underbrace{\iint_S \frac{e^{-ikR} - 1}{R} da'}_{IG_2} + \underbrace{\iint_S \frac{1}{R} da'}_{IG_4} \quad (50b)$$

The singular integrals $IG_3$ and $IG_4$ can be evaluated analytically. Numerical integration formulas are used to evaluate the integrals $IG_1$ and $IG_2$, since the integrands are continuous and bounded throughout the element surface.

De l'Hospital's rule gives the following limit as R→0 the integrands from $IG_2$:

$$\lim_{R \to 0} \frac{e^{-ikR} - 1}{R} = \lim_{R \to 0} \frac{-ik \cdot e^{-ikR}}{1} = -ik \quad (51)$$

The following is correspondingly found for the integrands from $IG_1$:

$$\lim_{R \to 0} \left[ (\tilde{r}' - \tilde{r}) \frac{e^{-ikR} - 1}{R} \right] = 0 \quad (52)$$

The Conjugate Gradient Method

Further to the possibility of solving the resulting equation systems (36) using direct methods, the use of iterative solution algorithms is also an option which is favorable in terms of efficiency. The linear equation system to be solved from equation (36) is generally represented as $$Ax = b \text{ mit } A \in C^{N \times N} \quad (53)$$

C denoting the set of complex numbers. A characteristic of iterative solution methods is the generated sequence of approximate solutions $x^{(m)}$, referred to as iterated functions. If this sequence converges with increasing m to the exact solution x, then the iteration process can be truncated once the desired accuracy has been reached.

While direct solution methods have an exactly determined computing cost, the cost for iterative solution methods depends directly on the number of iteration steps needed, and is therefore mostly unknown in advance.

To solve the equation systems, direct solution methods need direct access to the individual matrix elements. Conversely, in the case of iterative solution methods, the matrix A preferably occurs only in the form of matrix/vector products, and need not therefore be given explicitly. Access to corresponding functions is sufficient for calculating the matrix/vector products. Depending on the iteration method, one or more matrix/vector products are calculated per iteration step, so that in the case of fully occupied matrices, $O(N^2)$ floating-point operations are generally required for this. It is therefore important, when iterative methods are used, to keep the number of iteration steps required as low as possible.

The CG (conjugate gradient) method class also includes the GMRES method as disclosed by "Youcef Saas and Martin H. Schultz: GMRES: A Generalized Minimal Residual Algorithm for Solving Nonsymmetric Linear Systems, SIAM J. Sci. Stat. Comp., Vol. 7, No. 3 pp 856-869, July 1986. The underlying algorithm of the method is based on a full QR decomposition of the resulting solution space, and is therefore extremely robust. In the present description, the GMRES method will be used as a representative of the CG methods, without the invention being restricted to the use of this method.

In order to make it possible to acces the solution quality during the iteration process, on the basis of the equation (53) a residue $r^{(m)}$.

$$r^{(m)} = b - Ax^{(m)} \tag{54}$$

Is introduced as a measure of the error for the iterated function $x^{(m)}$. The true error $e^{(m)}$ $$e^{(m)} = x - x^{(m)} \tag{55}$$

is generally unknown for lack of an exact solution X. The residue $R^{(m)}$ measures the error on the right-hand side, that is to say, in the case of the moment method, the accuracy with which the boundary conditions are satisfied after the m-th iteration step. After substituting equation (55) in equation (54) the following relationship is found, while taking into account equation (53)

$$r^{(m)} = Ae^{(m)} \tag{56}$$

The truncation criterion preferably adopted from the iteration process is when the residue norm $|r^{(m)}|$ has been reduced by a predeterminable factor $\epsilon$, for example $10^{-4}$. If the iteration process is started with the null vector as initial value, then the iteration can be truncated as soon as the inequality $$\frac{\|r^{(m)}\|}{\|r^{(0)}\|} = \frac{\|r^{(m)}\|}{\|b\|} < \varepsilon \tag{57}$$

is satisfied. In principle, the truncation criterion should be chosen in such a way that the error due to truncating the iteration is just less than the discretization error.

The total number of iteration steps needed to reach the truncation criterion is denoted M, with m=1, 2, . . . , M.

Preconditioning

In most problems, the convergence behavior of the iteration process can be accelerated by so-called preconditioning.

Distinction may be made between preconditioning on the left and preconditioning on the right. Equation (53) leads to the following for the left-transformed equation system $$M^{-1}Ax = M^{-1}b \Leftrightarrow \hat{A}x = \hat{b} \; mit \; \hat{A} = M^{-1}A \tag{58}$$

$$\hat{b} = M^{-1}b$$

The matrix $M^{-1}$ is referred to as the preconditioner. In the case M=A all the eigenvalues of $\hat{A}$ are, for example, 1 so the exact solution is found after just a single iteration. However, with preconditioning of this type, the cost of calculating $M^{-1}$ is just as great as when the equation system is solved directly. In principle, it is also true that the effect of the preconditioning is commensurately better if the matrices A and M are similar.

When using equation (58), the value $\hat{b}$ at the start of the iteration process must firstly be determined using a simple matrix/vector product. On the grounds of efficiency, the matrix $\hat{A}$ is preferably not calculated explicitly. Since, in the CG methods, all the matrices occur only in the form of matrix/vector products, it is more favorable to evaluate such operations sequentially, that is to say in the form of two separate matrix/vector products. Furthermore, calculating a suitable factorization of M will suffice instead of the inverses $M^{-1}$. The relevant matrix/vector products must then, however, be replaced by suitable back-substitution routines.

Right preconditioning is carried out in similar fashion to left preconditioning:

$$AM^{-1}Mx = b \Leftrightarrow \hat{A}\hat{x} = \hat{b} \; mit \; \hat{A} = AM^{-1} \tag{59}$$

$$\hat{x} = Mx$$

When using equation (59), the desired solution x must be calculated after the actual integration process using an additional matrix/vector product according to $x = M^{-1}\hat{x}$.

Since the convergence behavior of the iteration process is determined by the distribution of the eigenvalues of $\hat{A}$, both preconditioning variants are equivalent in terms of convergence behavior. In comparison with left transformation, right preconditioning has, however, the advantage that the residue from equation (54) can be adopted unchanged as an error measure. In the case of left preconditioning, the residue from equation (54) cannot usually be calculated without additional cost. It is then advantageous to use the following form instead of the residue established in equation (54)

$$\hat{r}^{(m)} = \hat{b} - \hat{A}x^{(m)} = M^{-1}r^{(m)} \tag{60}$$

In this case, the matrix $M^{-1}$ causes distortions which can unfavorably affect the truncation criterion.

Jacobi Preconditioning

One possible way of preconditioning consists of the diagonal matrix $$M_{ij} = \begin{cases} A_{ij} & \text{for } i = j \\ 0 & \text{otherwise} \end{cases}. \tag{61}$$

The use of this so-called Jacobi preconditioning on the left or on the right corresponds to a diagonal scaling of A, in which the diagonal elements are converted to one by multiplying the equation system through by rows or by columns.

A further advantageous preconditioning method consists in a block variant of the Jacobi preconditioning. In this case, an index set of the degrees of freedom

F={1, 2, . . . , N} must firstly be divided according to $$F = \bigcup_w F_w$$

into pairwise disjoint subsets $F_w$. The number of these subsets will be denoted W. The matrix M is then given through the relationship $$M_{ij} = \begin{cases} A_{ij} & \text{for } i = j \\ 0 & \text{otherwise} \end{cases} \tag{62}$$

In the case of this type of block Jacobi preconditioning, the matrices M and $M^{-1}$ are block diagonal matrices. The matrix/vector product $M^{-1}x$ can be calculated efficiently using separate factorizations of the individual diagonal blocks.

The convergence behavior is particularly good if the index sets $F_w$ can be assigned to physical subregions. Such subregions, in the simplest case cubes, can be produced by stepwise subdivision of the body in question in the form of a tree-like structure. At each refinement step, the cubes which have already been generated are preferably split into up to eight daughter cubes with halved side length. Empty regions are usually ignored. The coarsest refinement stage, that is to say a single block, is denoted stage 0. The stage index increases correspondingly by one at each refinement step.

The degrees of freedom are advantageously permuted before the actual iteration process, so that the block structure which arises in the equation system can be handled by programming. To this end, the indices are rearranged in such away that successive degrees of freedom are assigned common subregions. Thereupon, the sub-problem assigned to the index sets $F_w$ can be extracted from A and solved using suitable factorization. The resulting factorizations are then combined to form the block diagonal matrix $M^{-1}$.

As an example, FIG. 6 shows the division of the bodywork of a car for refinement stages 2, 3 and 4.

The use of Jacobi preconditioning is not restricted to physical subregions of the same size. Especially in the case of discretization with greatly varying element sizes, there is the opportunity to subdivide the body into different sizes of subregions. FIG. 7 represents adaptive block Jacobi preconditioning for the case of a conductor track over an infinite earth surface. In order for the current distribution to be reconstructed as accurately as possible by the basis functions which are employed, the area around the conductor loop is finely gridded. It is preferable to have chosen the subregions in such a way that no more than 300 degrees of freedom are contained in each region.

The FFS (Fast Frequency Stepping) Method

Many practical EMV problems require broadband characterization of the object to be examined. Guidelines governing both interference immunity and emission extend over wide frequency ranges, so that, in order to simulate the corresponding measurements, it is necessary to carry out extensive series of computations, in which the frequency f, in similar fashion to real measurement, is increased from a lowest frequency $f_{min}$ for investigation to a highest frequency $f_{max}$ for investigation. So as not to miss any critical frequency range, the step size $\Delta f$ which is used should be chosen as small as possible.

One approach for reducing the computation cost while using iterative solution methods results from the observation, that, for sufficiently small frequency steps, the solution vectors of interest do not differ too much from one another. It is thus possible to use the last calculated solution vector as the new start value.

A further advantageous development consists in determining the start value by extrapolation from solution vectors which have already been calculated. For the special case of equidistant frequencies, the following relationship $$x_i^{(0)} = x_{i-3} - 3x_{i-2} + 3x_{i-1} \tag{63}$$

can, for example, be written for quadratic extrapolation of a start value $x_i^{(0)}$ from the last three solution vectors $x_{i-3}$, $x_{i-2}$ and $x_{i-1}$.

Fast convergence may be observed if one of the equation systems is solved using a direct solution method and the calculated factorization is subsequently taken as a preconditioner for iterative solution of the remaining equation system.

Combining this scheme with the extrapolation approach described above gives an effective procedure for good broadband analysis of electrodynamic scattering problems. This method is referred to below as the FFS method. The algorithm for the special case of equidistant frequencies is as follows:

f: $=f_{min}$
calculate A and b
calculate $M^{-1}$: $=$A(or factorization of A)
x: $=M^{-1}b$
if f<$f_{max}$
f:=f+$\Delta$f
calculate A and b
extrapolate a start value $\hat{x}^{(0)}$
solve A $M^{-1}\hat{x}=b$ iteratively $$x:=M^{-1}\hat{x} \tag{Alg-1}$$

The computation series is, for example, started at the lowest frequency $f_{min}$. After the corresponding equation system has been set up, and the matrix A has been factorized suitably, the first solution vector is given by back substitution. The calculated factorization of A is then taken as a preconditioner $M^{-1}$ for iteratively solving the remaining equation systems. The frequency f is for this purpose increased stepwise from $f_{min}$ to $f_{max}$, it being necessary in the case of right preconditioning to pay attention that the transformed value $\hat{x}$ is to be extrapolated instead of the actual solution vector x. The actual solution vector x can be determined after the iteration process through the relationship $x:=M^{-1}\hat{x}$.

The required computation cost is, in the FFS method, determined essentially by the factorization of the matrix M, that is to say by the direct solution of the equation system. Using the matrix $M^{-1}$ as a preconditioner, the subsequent iterative solution of the remaining equation systems is usually limited to a few iterations.

The sequence in which the individual frequencies are run through in the FFS method need not necessarily, as represented in the algorithm (Alg-1), be from $f_{min}$ to $f_{max}$. Likewise, variants of the method are conceivable which start at the highest frequency $f_{max}$, solve the corresponding equation system directly and subsequently reduce the frequency stepwise.

The preconditioner $M^{-1}$ can furthermore be calculated for a central frequency $f_c$. The frequencies are then, according to choice, run through from $f_{min}$ to $f_{max}$, from $f_{max}$ to $f_{min}$ or firstly from $f_c$ to $f_{min}$ and subsequently from $f_c$ to $f_{max}$. The advantage of these alternatives consists in the fact that the broadband acceleration effect of the matrix $M^{-1}$ can be used in both frequency directions.

Multipole Expansion of the Retarded Potentials

Central to a fast multipole method are methods with which the potentials and fields of a given current distribution can be characterized approximately by a few scalar coefficients. As indicated by the term "multipole method", preferably spherical multipole expansions of the potentials or fields are used.

Since the line weighting method used in this invention (see above for details) is based on the retarded potentials A and $\phi$, these two quantities are characterized by corresponding multipole expansions.

As an alternative to this, it is possible to make a multipole expansion of the electric field strength E. In comparison with the multipole expansions of the retarded potentials A and $\phi$, the latter does, however, lead to more complex analytical relationships which are difficult to handle numerically.

The aim is to find a set of solutions of the homogeneous Helmholtz equation $$(\nabla^2 + k^2) \cdot u = 0 \tag{64}$$

in spherical coordinates, k denoting the wave number, and u denoting a function which satisfies the Helmholtz equation.

Using these solutions, any function u can be represented in the form of an infinite series. The coefficients which occur in this case can frequently be determined analytically.

Figure 8:
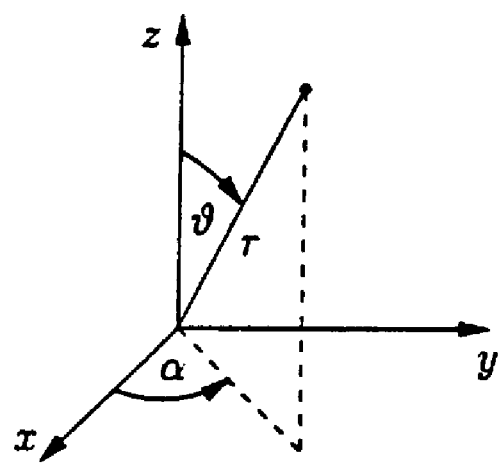

If the Helmholtz equation (64) is expressed using the spherical coordinates r, $\theta$, $\alpha$ represented in FIG. 8, this gives the following formulation $$\frac{1}{r^2}\frac{\partial}{\partial r}\left(r^2\frac{\partial u}{\partial r}\right) + \frac{1}{r^2 \sin\vartheta}\left(\sin\vartheta\frac{\partial u}{\partial \vartheta} + \frac{1}{r^2 \sin^2\vartheta}\frac{\partial^2 u}{\partial \alpha^2}\right) + K^2 u = 0. \tag{65}$$

In order to solve this partial differential equation, a separation theorem is chosen $$u = U_r(r) \cdot U_\theta(\theta) \cdot U_\alpha(\alpha) \tag{66}$$

in which the factors $U_r$, $U_\theta$, and $U_\alpha$ each depend on only one coordinate. After substituting equations (66) in equation (65) and multiplying by $$\frac{r^2 \sin^2 \vartheta}{u}$$

the following equation is found $$\frac{\sin^2\vartheta}{U_r}\frac{d}{dr}\left(r^2\frac{dU_r}{dr}\right) + \tag{67}$$
$$\frac{\sin\vartheta}{U_\vartheta}\frac{d}{d\vartheta}\left(\sin\vartheta\frac{dU_\vartheta}{d\vartheta}\right) + \frac{1}{U_\alpha}\frac{d^2 U_\alpha}{d\alpha^2} + k^2 r^2 \sin^2\vartheta = 0.$$

The $\alpha$-dependent term can be split and, using separation constants m, replaced by $$\frac{1}{U_\alpha}\frac{d^2 U_\alpha}{d\alpha^2} = -m^2. \tag{68}$$

Equation (67) then gives the following relationship which is independent of $\alpha$ $$\frac{1}{U_r}\frac{d}{dr}\left(r^2\frac{dU_r}{dr}\right) + \frac{1}{U_\vartheta \sin\vartheta}\frac{d}{d\vartheta}\left(\sin\vartheta\frac{dU_\vartheta}{d\vartheta}\right) - \frac{m^2}{\sin^2\vartheta} + k^2 r^2 = 0. \tag{69}$$

In order to separate the $\theta$-dependency, the corresponding terms in equation (69) are expressed using the separation constant l:

$$\frac{1}{U_\vartheta \sin\vartheta}\frac{d}{d\vartheta}\left(\sin\vartheta\frac{dU_\vartheta}{d\vartheta}\right) - \frac{m^2}{\sin^2\vartheta} = -1(1+1). \tag{70}$$

This leaves the r-dependent differential equation $$\frac{1}{U_r}\frac{d}{dr}\left(r^2\frac{dU_r}{dr}\right) - 1(1+1) + k^2 r^2 = 0. \tag{71}$$

Using the separation theorem from equation (66), the Helmholtz equation can accordingly be converted into three ordinary differential equations $$\frac{d}{dr}\left(r^2\frac{dU_r}{dr}\right) + [(kr)^2 - 1(1+1)]\cdot U_r = 0 \tag{72a}$$

$$\frac{1}{\sin\vartheta}\frac{d}{d\vartheta}\left(\sin\vartheta\frac{dU_\vartheta}{d\vartheta}\right) + \left[1(1+1) - \frac{m^2}{\sin^2\vartheta}\right]\cdot U_\vartheta = 0 \tag{72b}$$

$$\frac{d^2 U_\alpha}{d\alpha^2} + m^2 U_\alpha = 0. \tag{72c}$$

The equation (72c) is an ordinary differential equation with constant coefficients and the solutions $$U_{\alpha,m} \sim e^{im\alpha} \tag{73}.$$

On account of the secondary condition $U\alpha(\alpha+2\pi)=U_\alpha(\alpha)$, m can take only integer values, i.e. m$\in$Z (Z being the set of whole numbers).

Equation (72b) is a special form of the Legendre differential equation. Its solutions are the associated Legendre functions of the first and second kind $$U_{\theta,lm} \sim P_l^m(\cos\theta), Q_l^m(\cos\theta) \tag{74}.$$

Almost all Legendre functions have singularities for $\theta=0$ and $\theta=\pi$, and are therefore preferably ignored. An exception to these are the functions $P_l^m(\cos\theta)$ with 1, m$\in$N$_0$, which are related to l-th order Legendre polynomials $P_1$ through the relationship $$P_l^m(x) = (-1)^m (1-x^2)^{m/2}\frac{d^m}{dx^m}P_1(x) \tag{75}$$

This gives $$P_l^0(\cos\theta) = P_l(\cos\theta) \tag{76}$$

and $$P_l^m(\cos\theta) = 0 \text{ für } m > l \tag{77}.$$

The zero to second order associated Legendre functions of the first kind are as follows:

| | |
|---|---|
| $P_0^0(\cos\theta) = 1$ | $P_2^0(\cos\theta) = \frac{1}{2}\cos^2\theta - \frac{1}{2}$ |
| $P_1^0(\cos\theta) = \cos\theta$ | $P_2^1(\cos\theta) = -3\sin\theta\cos\theta$ |
| $P_1^1(\cos\theta) = -\sin\theta$ | $P_2^2(\cos\theta) = 3\sin^2\theta$ |

Equation (72a) is a Bessel differential equation with the spherical Bessel functions as solution.

$$U_{r,l} = j_l(kr), y_l(kr) \tag{78}$$

These are related to the known cylindrical Bessel functions $J_1(x), Y_1(x)$ through the relationships $$j_1(x) = \sqrt{\frac{\pi}{2x}} \cdot J_{1+0.5}(x), \quad y_1(x) = \sqrt{\frac{\pi}{2x}} \cdot y_{1+0.5}(x) \tag{79}$$

and can be represented by elementary functions. Thus, for example $$j_0(kr) = \frac{\sin(kr)}{kr} \qquad y_0(kr) = -\frac{\cos(kr)}{kr}$$

$$j_1(kr) = \frac{\sin(kr)}{(kr)^2} - \frac{\cos(kr)}{kr} \qquad y_1(kr) = -\frac{\cos(kr)}{(kr)^2} - \frac{\sin(kr)}{kr}.$$

Combining the spherical Bessel functions gives the spherical Hankel functions of the first and second kind.

$$h_l^{(1)}(kr) = j_l(kr) + i \cdot y_l(kr) \tag{80a}$$

$$h_l^{(2)}(kr) = j_l(kr) - i \cdot y_l(kr) \tag{80b},$$

which are equivalent in terms of representing the total solution u to the functions $j_l(kr), y_l(kr)$ Depending on the kind of function u, it may be advantageous to favor spherical Bessel functions or spherical Hankel functions. If, for example, the function u remains bounded at the origin, then it is sufficient merely to apply the functions $j_l(kr)$, since the functions $y_l(kr)$, and therefore the spherical Hankel functions $h_l^{(1)}(kr), h_l^{(2)}(kr)$, become singular for $r \to 0$.

The desired solutions $u_{lm}$ of the homogeneous Helmholtz equation in spherical coordinates are given as $$u_{lm} = b_l(kr) \cdot P_l^{|m|}(\cos\theta) \cdot e^{im\alpha} \tag{81}$$

$b_l(kr)$ denoting a linear combination of $1^{st}$ order spherical Bessel or Hankel functions, and $l \in N_0$ and $m \in Z$.

For the full solution u, taking account of equation (77) gives the series expansion $$u = \sum_{l=0}^{\infty} \sum_{m=-l}^{l} c_{ml} \cdot u_{ml} = \sum_{l=0}^{\infty} \sum_{m=-l}^{l} c_{ml} \cdot b_l(kr) \cdot p_l^{|m|}(\cos\vartheta) \cdot e^{im\alpha} \tag{82}$$

with the constant coefficients $C_{lm}$.

Spherical Harmonics

If the angle-dependent terms $P_l^{|m|}(\cos\theta)$ and $e^{im\alpha}$ from equation (82) are combined, this gives the so-called spherical harmonics $Y_l^m(\theta,\alpha)$. Given a suitable normalization factor, they are defined as follows $$y_l^m(\vartheta, \alpha) := \sqrt{\frac{2l+1}{4\pi} \frac{(1-m)!}{(1+m)!}} \cdot p_l^m(\cos\vartheta) \cdot e^{im\alpha} \tag{83}$$

for $0 \leq m \leq 1$. Spherical harmonics with $m<0$ can be defined through a symmetry relationship $$Y_l^{-m}(\theta,\alpha) = (-1)^m Y_l^m(\theta,\alpha)^* \tag{84}.$$

The following orthonormality condition is therefore satisfied $$\oiint_\Omega Y_l^m(\vartheta, \alpha) \cdot Y_{l'}^{m'}(\vartheta, \alpha)^* da = \delta_{ll'} \cdot \delta_{mm'} \tag{85}$$

n whereby $\Omega$ denoting the surface of a unit sphere, $\delta$ denoting a Kronecker symbol defined as $$\delta_{ll'} = \begin{cases} 1 & \text{for } l = l' \\ 0 & \text{otherwise} \end{cases} \tag{86}$$

The spherical harmonics form on $\Omega$ a complete set of orthonormal functions in terms of the indices 1 and m. One of the most important properties of spherical harmonics is the consequent fact that any bounded function $g(\theta,\alpha)$ can be developed in a series using the $Y_l^m(\theta,\alpha)$ spherical harmonics $$g(\vartheta, \alpha) = \sum_{l=0}^{\infty} \sum_{m=-l}^{l} c_{m1} \cdot Y_l^m(\vartheta, \alpha). \tag{87}$$

Taking into account equation (85), the coefficients $C_{lm}$ are determined through the relationship $$c_{1m} = \oiint_\Omega g(\vartheta, \alpha) \cdot y_l^m(\vartheta, \alpha)^* da. \tag{88}$$

The spherical harmonics of zero to second order are as follows:

$$Y_0^0 = \frac{1}{\sqrt{4\pi}}$$

$$Y_1^{-1} = \sqrt{\frac{3}{8\pi}} \cdot \sin\vartheta \cdot e^{-i\alpha}$$

$$Y_1^0 = \sqrt{\frac{3}{4\pi}} \cdot \cos\vartheta$$

$$Y_1^1 = -\sqrt{\frac{3}{8\pi}} \cdot \sin\vartheta \cdot e^{i\alpha}$$

$$Y_2^{-2} = \sqrt{\frac{15}{32\pi}} \cdot \sin^2\vartheta \cdot e^{-i2\alpha}$$

$$Y_2^{-1} = \sqrt{\frac{15}{8\pi}} \cdot \sin\vartheta \cdot \cos\vartheta \cdot e^{-i\alpha}$$

$$Y_2^0 = \sqrt{\frac{5}{4\pi}} \cdot \left(\frac{3}{2}\cos^2\vartheta - \frac{1}{2}\right)$$

$$Y_2^1 = -\sqrt{\frac{15}{8\pi}} \cdot \sin\vartheta \cdot \cos\vartheta \cdot e^{i\alpha}$$

$$Y_2^2 = \sqrt{\frac{15}{32\pi}} \cdot \sin^2\vartheta \cdot e^{i2\alpha}$$

Addition Theorem for the Green Function

The Green function $$G(r, r') = \frac{e^{-ikR}}{R} \text{ with } R = \|r - r'\| \tag{89}$$

describes, to within a constant factor, the retarded potential of an oscillating point charge located at a position r'. The development of the Green function in spherical solution of the Helmholtz equation has the following form:

$$\frac{e^{-ikR}}{R} = \begin{cases} -4\pi i k \sum_{l=0}^{\infty} \sum_{m=-l}^{l} j_l(kr') Y_l^m(\vartheta', \alpha') h_l^{(2)}(kr) Y_l^m(\vartheta, \alpha)^* \forall r > r' \\ -4\pi i k \sum_{l=0}^{\infty} \sum_{m=-l}^{l} h_l^{(2)}(kr') Y_l^m(\vartheta', \alpha') j_l(kr) Y_l^m(\vartheta, \alpha)^* \forall r < r' \end{cases} \tag{90}$$

Multipole Expansions

Using equation (90), the multipole expansion of the retarded potential A and φ can be derived. To do this, equation (90) is substituted in equations (14a) and (14b) and the order of integration and summation is reversed. A rearrangement of this type is permissible since the special case r=r' has already been excluded in equation (90). The vector potential A is developed by separate application of equation (90) to the three Cartesian components $A_x$, $A_y$ and $A_z$.

Different kinds of multipole expansions result depending on the position of the observer and source points. The arrangement sketched in FIG. 9a, with r>r', leads to the so-called global multipole expansion, in which the external effect of a local source distribution G is represented in the form of a multipole expansion. The two circles which are sketched with radii d and D indicate the boundaries for a near field (less than radius d) and a far field greater than radius D).

The corresponding series expansions for the retarded potentials are given as $$A(r) = -ik\mu_0 \sum_{l=0}^{\infty} \sum_{m=-l}^{l} a_{lm}^g h_l^{(2)}(kr) Y_l^m(\vartheta, \alpha)^* \tag{91a}$$

$$\varphi(r) = -\frac{ik}{\varepsilon_0} \sum_{l=0}^{\infty} \sum_{m=-l}^{l} p_{lm}^g h_l^{(2)}(kr) Y_l^m(\vartheta, \alpha)^*,$$

it being possible to calculate the global multipole coefficients $a_{lm}^g$ and $P_{lm}^g$ through the relationships $$a_{lm}^g = \iiint_G J(r') j_l(kr') Y_l^m(\vartheta', \alpha') dV' \tag{91b}$$

$$p_{lm}^g = \iiint_G \rho(r') j_l(kr') Y_l^m(\vartheta', \alpha') dV'$$

To simplify the expression, the three scalar multipole coefficients of A have been combined to form vectorial coefficients $a_{mn}$.

Figure 9A:
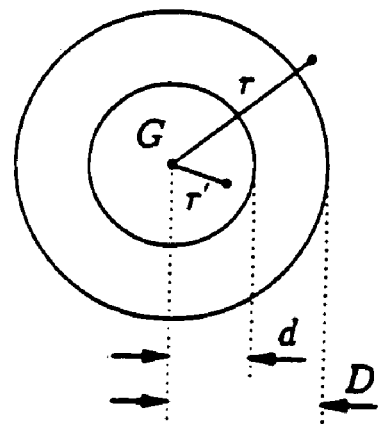
FIG. 9a shows a sketch representing the geometrical dimensions for the global multipole expansion.
Figure 9B:
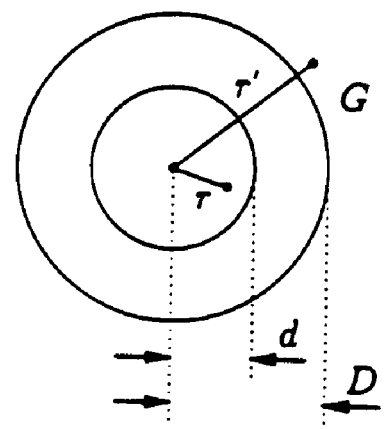
FIG. 9b shows a sketch representing the geometrical dimensions for the local multipole expansion.

The case sketched in FIG. 9b, in which the observer points are closer to the coordinate origin than the source point, i.e. r<r', leads to a local multipole expansion. In this case, the effect of a sufficiently distant source distribution G is developed locally. The retarded potentials A and φ become $$A(r) = -ik\mu_0 \sum_{l=0}^{\infty} \sum_{m=-l}^{l} a_{lm}^l j_l(kr) Y_l^m(\vartheta, \alpha)^* \tag{92a}$$

$$\varphi(r) = -\frac{ik}{\varepsilon_0} \sum_{l=0}^{\infty} \sum_{m=-l}^{l} p_{lm}^l j_l(kr) Y_l^m(\vartheta, \alpha)^*$$

with the local multipole coefficients $$a_{lm}^l = \iiint_G J(r') h_l^{(2)}(kr') Y_l^m(\vartheta', \alpha') dV' \tag{92b}$$

$$p_{lm}^l = \iiint_G \rho(r') h_l^{(2)}(kr') Y_l^m(\vartheta', \alpha') dV'.$$

In the scope of a programmed embodiment, the series expansions (91a) and (92a) are truncated after a finite number of terms. If, for the outer summation index l=0, 1, . . . , L, then it can be shown by full induction that the resulting L-th order multipole expansions always contain $(L+1)^2$ terms. The total of $4(L+1)^2$ scalar coefficients are therefore required for multipole expansion of the retarded potentials A, φ to L-th order.

According to the value of l, the most important multipole coefficients are customarily referred to as l=0: Monopole coefficient
l=1: Dipole coefficient
l=2: Quadripole coefficient
l=3: Octopole coefficient
l=4: Hexadecapole coefficient, etc.

According to FIG. 9a and FIG. 9b, the observer region is separated from the source region by two spherical surfaces having radii d and D respectively. For d<<λ, the convergence of the multipole expansions is oriented towards the static case and depends essentially on the ratio d/D. The series converge better the smaller the chosen value of d/D. However, in the case of a source region which is larger in electrical terms, i.e.

is of the order of a wavelength or more, complex interference patterns are formed, and $L \geq kd$ is preferably chosen in order to deal with them.

Multipole Expansions of the Subregions

In the scope of a fast multipole method, the above-described subdivision of the body to be investigated is resorted to.

In each subregion resulting from the subdivision, an independent global and local multipole expansion are employed, i.e. for each index set of the degrees of freedom $F_w$, there is both a series of global multipole coefficients $a_{lm}^g$, $p_{lm}^g$ and a series of corresponding local multipole coefficients $a_{lm}^l$, $p_{lm}^l$. The multipole expansions are in this case made relative to the respective cube center $r_w^c$.

If the representation of the current distribution using the basis function $\vec{\psi}_n$ (see equations (29a) and (29b)) is substituted in equations (91a,b) and (92a,b), then the following is found for the global multipole expansions in the individual subregions.

$$A_w(r) = -ik\mu_0 \sum_{l=0}^{L} \sum_{m=-l}^{l} a_{lm,w}^l h_l^{(2)}(k\tilde{r}) Y_l^m(\tilde{\vartheta}, \tilde{\alpha})^* \quad (93a)$$

$$\varphi_w(r) = -\frac{k}{w\varepsilon_0} \sum_{l=0}^{L} \sum_{m=-l}^{l} p_{lm,w}^g h_l^{(2)}(k\tilde{r}) Y_l^m(\tilde{\vartheta}, \tilde{\alpha})^*$$

with the global multipole coefficients $$a_{lm,w}^g = \sum_{n \in F_w} I_n \int_{S_n} \int \vec{\psi}_n(r') j_l(k\tilde{r}') Y_l^m(\tilde{\vartheta}', \tilde{\alpha}') da' \quad (93b)$$

$$p_{lm,w}^g = \sum_{n \in F_w} I_n \int_{S_n} \int \nabla_S' \cdot \vec{\psi}_n(r') j_l(k\tilde{r}') Y_l^m(\tilde{\vartheta}', \tilde{\alpha}') da'$$

and for the local multipole expansions in the individual subregions $$A_w(r) = -ik\mu_0 \sum_{l=0}^{L} \sum_{m=-l}^{l} a_{lm,w}^l j_l(k\tilde{r}) Y_l^m(\tilde{\vartheta}, \tilde{\alpha})^* \quad (94a)$$

$$\varphi_w(r) = -\frac{k}{w\varepsilon_0} \sum_{l=0}^{L} \sum_{m=-l}^{l} p_{lm,w}^l j_l(k\tilde{r}) Y_l^m(\tilde{\vartheta}, \tilde{\alpha})^*$$

with the local multipole coefficients $$a_{lm,w}^l = \sum_{n \in F_w \setminus N_w} I_n \int_{S_n} \int \vec{\psi}_n(r') h_l^{(2)}(k\tilde{r}') Y_l^m(\tilde{\vartheta}', \tilde{\alpha}') da' \quad (94b)$$

$$p_{lm,w}^l = \sum_{n \in F_w \setminus N_w} I_n \int_{S_n} \int \nabla_S' \cdot \vec{\psi}_n(r') h_l^{(2)}(k\tilde{r}') Y_l^m(\tilde{\vartheta}', \tilde{\alpha}') da'.$$

The tilde above the spherical coordinates, r, θ and α indicates that they are in this case local coordinates relating to the respective cube center $r_w^c$. When determining the local multipole coefficients in equation (94b), account is taken of source regions lying outside the neighboring regions, i.e. $n \in F \setminus N_w$.

Since the bodies to be investigated in the field of EMV simulation (printed circuit boards, wiring, etc.) Preferably lead to small subregions, the convergence behavior of the series expansions from equations (93a) and (94a) is determined predominantly by the ratio d/D. For the case in which the global multipole expansions (93a) are evaluated outside the neighboring regions, then the following is satisfied for cubic subregions in three spatial dimensions, both for the global and for the local expansions.

$$\frac{d}{D} = \frac{1}{\sqrt{3}}.$$

Stability Problems at Low Frequency

If the body to be investigated is divided up according to degrees of freedom or according to basis functions, then instabilities in terms of the global multipole expansion of the electric scalar potential φ can arise at low frequencies.

Figure 10A:
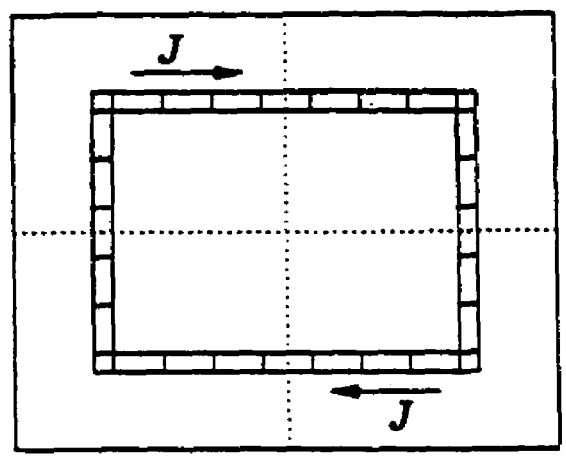
FIG. 10a shows a sketch representing a conductor loop and the division of the basis functions into four subregions.
Figure 10B:
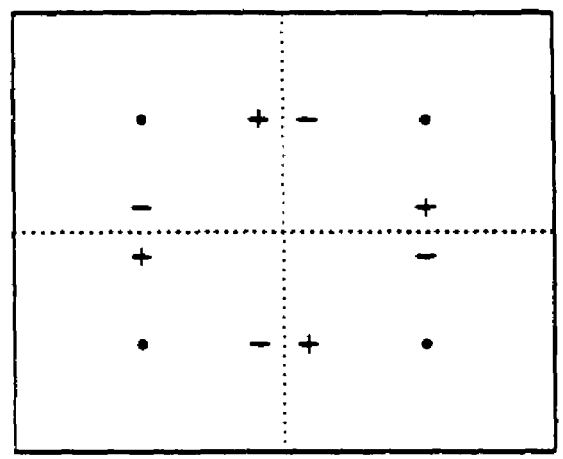
FIG. 10b shows a sketch showing the charges which are formed at the edges of the subregions, cannot be resolved further and lead to truncation errors in the expansion of $\phi$.

FIG. 10 illustrates the problem with reference to the example of a simple conductor loop whose scalar potential is to be represented by four global multipole expansions (FIG. 10a). With decreasing frequency, the total charge on the conductor surface vanishes since an increasingly uniform current distribution is set up. However, on account of the continuity equation, the charges in the individual basis functions grow at the same time as 1/ω (cf equation (29b)). So long as the basis functions overlap, the charges can cancel one another and meet the requirement for a vanishing total charge. However, the "stretching" of the basis functions keeps, on the boundary elements, charges which can no longer compensate one another since they are assigned to different multipoles (see FIG. 10b). If the multipole expansion of φ is truncated after a finite number of terms, then this results in truncation errors which cause increasing problems as the frequency decreases.

This situation can be ameliorated by giving the charges the opportunity to cancel out before the actual multipole expansions are made. One possible programmed embodiment consists in making all the global multipole expansions according to elements instead of according to basis functions.

The Fast Multipole Method (FMM)

The fast multipole method, hereafter referred to as FMM, is disclosed, for example, by V. Rokhlin: Rapid Solution of Integral Equations of Classical Potential Theory, Journal of Computational Physics, Vol. 60, pp. 187-207, 1985. All ways of implementing the FMM for the dynamic case are suitable for scattering problems in which subregions are substantially larger than the wavelength. In problems of this type, a high order is needed for the multipole expansions used. A substantial disadvantage with this formalism results from the property that the multipole coefficients are not calculated explicitly. Instead of explicit calculation, the function to be expanded is "sampled" at discrete points on a spherical envelope surface, whereupon the test values are directly processed further. Since the multipole terms of higher order cannot be suppressed readily in this case, interference may arise from aliasing effects which, under certain circumstances, can lead to errors in the multipole expansions.

The method proposed here is suitable, in particular, for simulating scattering problems in which the geometrical structures of the models and therefore the dimensions of the subregions as well are smaller than the wavelength. With these assumptions, the interference effects will remain limited, so that just a few multipole coefficients will be sufficient for describing potentials or field strengths. With the stabilization method described here, the method will behave stably even for low frequencies.

It is particularly interesting to use the fast multipole method in the field of EMC problems involving radiation. The measurements to be simulated are preferably carried out to within a few dB.

When applying the described iterative solution methods to fully occupied equation systems, the matrix/vector product to be calculated preferably leads to a complexity of $O(N^2)$ floating-point operations per iteration step. In contrast, on account of the special structure of the underlying integral equations, using the FMM makes it possible to calculate the matrix/vector product and therefore also an iteration step in fewer than $O(N^2)$ floating-point operations.

A condensed representation of the following form will be used for the matrix Z $$Z=Z'+LTG \qquad (95),$$

Z' denoting that part of the matrix Z which describes the coupling between neighboring subregions LTG denoting the remaining part of the matrix Z, which describes the coupling between distant subregions, i.e. $i \in F_w$, $j \in F \backslash N_w$ In the case when the stabilization measures explained above are dispensed with (see section: Stability Problems at Low Frequencies), the Z' matrix is determined according to $$Z'_{ij} = \begin{cases} Z_{ij} & \text{for } i \in F_w, j \in N_w \\ 0 & \text{otherwise} \end{cases} \qquad (96)$$

In the stabilized case, additional correction terms are involved.

Figure 11:
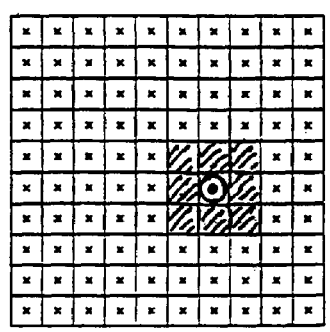
FIG. 11 shows a sketch representing the directly and indirectly coupled subregions.

FIG. 11 represents an observer region BG of the index set $F_w$, which is surrounded by neighboring regions NG of the index set $N_w$. The neighboring regions NG are therefore directly coupled. Distant regions WEG are represented as indirect coupling with the observer region BG. Global multipole expansions GMPE are made in regions with a cross, while the local multipole expansion is made in the observer region BG.

The global multipole coefficients $a_{lm,w}^g$, $p_{lm,w}^g$ of the individual subregions will be combined below in a vector $c^g$. Similarly, a vector $c^l$ contains all the local multipole coefficients $a_{lm,w}^l$, $p_{lm,w}^l$. In the scope of the local multipole expansion, the neighboring regions in FIG. 11 are not taken into account since the corresponding contributions are already contained in the matrix Z'. If the multipole expansions are made to L-th order, then the following is found in the case of W subregions $$c^g, c^l \in C^{4W(L+1)^2}.$$

The vectors $c^g$ and $c^l$ are calculated through the relationships $$c^g = G \cdot I \qquad (97a)$$

$$c^l = T \cdot c^g = T \cdot G \cdot I \qquad (97b)$$

i.e. the matrix G makes it possible to determine the global multipole expansions in the subregions for a given current distribution I. The so-called translation matrix T then calculates the local multipole coefficients $c^l$ therefrom. The translation matrix T collects the global multipole expansions represented by crosses in FIG. 11 in a local multipole expansion.

Finally, the local multipole expansions are evaluated at the observer points using the matrix L and added to the neighboring contributions:

$$ZI = Z'I + Lc^l \qquad (98).$$

In the unstabilized case, the matrices G and L are block diagonal matrices, the individual diagonal blocks relating the multipole expansions of the subregions to the basis functions contained therein. Relationships for calculating the matrix elements of G follow directly from the global multipole expansion according to equations (93a,b). The desired matrix elements correspond to the integral terms occurring in equation (93b). Relationships for calculating the matrix elements of L are given by substituting equation (94a) into the weighting equation (34). In this regard it should preferably be noted that the quantities A, $\phi$ from equation (34) are to be replaced by the contributions of the respective subregions $A_w$, $\phi_w$.

Elements which have impedance can be taken into account according to the procedure described above. Since correction terms occur only for neighboring elements, the modifications to be made to the matrix Z' remain limited.

The calculation of the translation matrix T is described below.

Translation Operators

Further to the individual multipole coefficients, unique characterization of multipole expansion involves specifying the coordinate system in relation to which the expansion is made. The multipole coefficients are in this case directly dependent both on the expansion center (coordinate original) and on the definition of the angle values $\theta$ and $\alpha$ (orientation of the coordinate axes).

The operators needed in the scope of the fast multipole method in order to convert the coefficients of a given multipole expansion to a new coordinate system are translation operators, since the orientation of the coordinate axes is preserved, in contrast to the so-called rotation operators. If the multipole expansions are truncated after a finite number of coefficients, the required translation operators can be specified in the form of fully occupied square translation matrices.

Figure 12:
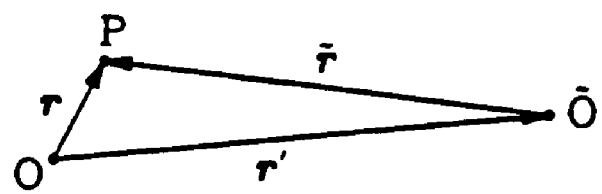
FIG. 12 shows a sketch representing the geometrical dimensions for the translation.

The geometricals mentioned used below are represented for illustration in FIG. 12. The position vector of a point P is denoted $\tilde{r} = (\tilde{r}, \tilde{\theta}, \tilde{\alpha})$ in the old coordinate system and $r = (r, \theta, \alpha)$ in the new coordinate system. Furthermore, the old coordinate origin $\tilde{O}$ is defined uniquely by the position vector $r' = (r', \theta', \alpha')$ in the new coordinate system. The translation therefore takes place in the negative r' direction. The translation operators considered here are preferably ones which convert a given global multipole expansion into a new local multipole expansion, that is to say $r < r'$.

The starting point is to derive the required translation operators from the addition theorem of the Green function (see equation (90)), which gives the relationship $$h_0^{(2)}(k\tilde{r})Y_0^0(\tilde{\vartheta}, \tilde{\alpha}) = \sqrt{4\pi} \sum_{l=0}^{L} \sum_{m=-l}^{l} h_l^{(2)}(kr')Y_l^m(\vartheta', \alpha') j_l(kr) Y_l^m(\vartheta, \alpha)^* \qquad (99)$$

for the translation of global monopole terms ($l=m=0$). The following identities have been taken into account here $$h_0^{(2)}(k\tilde{r}) = i\frac{e^{-ik\tilde{r}}}{k\tilde{r}} \quad und \quad Y_0^0(\tilde{\vartheta},\tilde{\alpha}) = \frac{1}{\sqrt{4\pi}}$$

The fact that equation (99) describes the desired translation can be shown in that the left-hand side contains the old monopole term which can be replaced by a superposition of new local multipole terms. The individual prefactors $$\sqrt{4\pi}h_l^{(2)}(kr')Y_l^m(\theta',\alpha')$$

depend only on the translation vector r' and can be calculated in advance and entered in the first column of the translation matrix.

For a programmed embodiment, the required operators are preferably determined recursively by successive differentiation of equation (99).

In order to describe the required differentiation relationships, the following differential operators are firstly introduced $$\partial_+ = \frac{\partial}{\partial x} + i \cdot \frac{\partial}{\partial y} \tag{100a}$$

$$\partial_- = \frac{\partial}{\partial x} - i \cdot \frac{\partial}{\partial y} \tag{100b}$$

$$\partial_z = \frac{\partial}{\partial z} \tag{100c}$$

This gives, for example, $$\partial_+ [h_0^{(2)}(kr)Y_0^0(\vartheta,\alpha)] = \sqrt{\frac{2}{3}} \, k \, h_l^2(kr)Y_l^1(\vartheta,\alpha) \tag{101a}$$

$$\partial_- [h_0^{(2)}(kr)Y_0^0(\vartheta,\alpha)] = -\sqrt{\frac{2}{3}} \, k \, h_l^2(kr)Y_l^{-1}(\vartheta,\alpha) \tag{101b}$$

$$\partial_z [h_0^{(2)}(kr)Y_0^0(\vartheta,\alpha)] = -\sqrt{\frac{1}{3}} \, k \, h_l^2(kr)Y_l^0(\vartheta,\alpha), \tag{101c}$$

i.e. first-order multipole terms (dipoles) can be derived directly by suitable differentiation of the monopole term. Corresponding relationships for multipole terms of higher order are derived below.

The following elementary differentiation relationships can be shown for spherical Hankel functions $$\partial_+ [r^{l+1}h_l^{(2)}(kr)] = kr^{l+1}h_{l-1}^{(2)}(kr)\sin\vartheta \, e^{i\alpha} \tag{102a}$$

$$\partial_- [r^{l+1}h_l^{(2)}(kr)] = kr^{l+1}h_{l-1}^{(2)}(kr)\sin\vartheta \, e^{-i\alpha} \tag{102b}$$

$$\partial_z [r^{l+1}h_l^{(2)}(kr)] = kr^{l+1}h_{l-1}^{(2)}(kr)\cos\vartheta. \tag{102c}$$

The corresponding is found for spherical harmonics $$\partial_+ \left[\frac{Y_l^m(\vartheta,\alpha)}{r^{l+1}}\right] = a_l^m(2l+1)\frac{Y_{l+1}^{m+1}(\vartheta,\alpha)}{r^{l+2}} \tag{103a}$$

$$\partial_- \left[\frac{Y_l^m(\vartheta,\alpha)}{r^{l+1}}\right] = -b_l^m(2l+1)\frac{Y_{l+1}^{m-1}(\vartheta,\alpha)}{r^{l+2}} \tag{103b}$$

$$\partial_z \left[\frac{Y_l^m(\vartheta,\alpha)}{r^{l+1}}\right] = -c_l^m(2l+1)\frac{Y_{l+1}^m(\vartheta,\alpha)}{r^{l+2}} \tag{103c}$$

with the constant coefficients $$a_l^m = \sqrt{\frac{(l+m+1)(l+m+2)}{(2l+1)(2l+3)}} \tag{104a}$$

$$b_l^m = \sqrt{\frac{(l-m+1)(l-m+2)}{(2l+1)(2l+3)}} \tag{104b}$$

$$c_l^m = \sqrt{\frac{(l+m+1)(l-m+1)}{(2l+1)(2l+3)}}, \tag{104c}$$

which result on account of the normalization factor from the definition of the spherical harmonics (see equation (83)). Combining equations (102a-c) with equations (103a-c) gives the differentiation relationships for multipole terms of higher order $$\partial_+ [h_l^2(kr)Y_l^m(\vartheta,\alpha)] = \tag{105a}$$
$$a_l^m(2l+1)\frac{h_l^{(2)}(kr)}{r}Y_{l+1}^{m+1}(\vartheta,\alpha) + kh_{l-1}^{(2)}(kr)\sin\vartheta \, e^{i\alpha}Y_l^m(\vartheta,\alpha)$$

$$\partial_- [h_l^2(kr)Y_l^m(\vartheta,\alpha)] = \tag{105b}$$
$$-b_l^m(2l+1)\frac{h_l^{(2)}(kr)}{r}Y_{l+1}^{m-1}(\vartheta,\alpha) + kh_{l-1}^{(2)}(kr)\sin\vartheta e^{-i\alpha}Y_l^m(\vartheta,\alpha)$$

$$\partial_z [h_l^2(kr)Y_l^m(\vartheta,\alpha)] = \tag{105c}$$
$$-c_l^m(2l+1)\frac{h_l^{(2)}(kr)}{r}Y_{l+1}^m(\vartheta,\alpha) + kh_{l-1}^{(2)}(kr)\cos\vartheta Y_l^m(\vartheta,\alpha),$$

which can be rearranged further using the recursion relationship for spherical Hankel functions $$h_{l-1}^{(2)}(kr) + h_{l+1}^{(2)}(kr) = (2l+1)\frac{h_l^{(2)}(kr)}{kr} \tag{106}$$

and the recursion relationships for spherical harmonics $$\sin\theta e^{i\alpha}Y_l^m(\theta,\alpha) = a_{l-1}^{-m-1} \cdot Y_{l-1}^{m+1}(\theta,\alpha) - a_l^m \cdot Y_{l-1}^{m+1}(\theta,\alpha) \tag{107a}$$

$$\sin\theta e^{-i\alpha}Y_l^m(\theta,\alpha) = -b_{l-1}^{-m-1} \cdot Y_{l-1}^{m-1}(\theta,\alpha) - b_l^m \cdot Y_{l+1}^{m-1}(\theta,\alpha) \tag{107b}$$

$$\cos\theta Y_l^m(\theta,\alpha) = c_{l-1}^m \cdot Y_{l-1}^m(\theta,\alpha) - c_l^m \cdot Y_{l+1}^m(\theta,\alpha) \tag{107c}.$$

This finally gives the symmetric differentiation relationships $$\theta \alpha [h_l^{(2)}(kr)Y_l^m(\theta,\alpha)] = a_l^m k h_{l+1}^{(2)} Y_{l+1}^{m+1}(\theta,\alpha) + + a_{l-1}^{-m-1} k h_{l-1}^{(2)} Y_{l-1}^{m+1}(\theta,\alpha) \tag{108a}$$

$$\theta - [h_l^{(2)}(kr)Y_l^m(\theta,\alpha)] = -b_l^m k h_{l+1}^{(2)} Y_{l+1}^{m-1}(\theta,\alpha) - - b_{l-1}^{-m+1} k h_{l-1}^{(2)}(kr) Y_{l-1}^{m-1}(\theta,\alpha) \tag{108b}$$

$$\theta_z[h_l^{(2)}(kr)Y_l^m(\theta,\alpha)] = -c_l^m kh_{l+1}^{(2)}Y_{l+1}^m(\theta,\alpha) + + c_{l-1}^m kh_{l-1}^{(2)}(kr)Y_{l-1}^m(\theta,\alpha) \quad (108c)$$

which can be used to calculate the desired translation operators. To this end, by successive differentiation of equation (99) with respect to the coordinates r', θ', α', (1+1) 1-th order translation operators are inferred from (1−1) 1-th order translation operators. It should be noted in this case that $\vartheta = -\partial'$.

Multistage Algorithms

Further to the described one-stage FMM, there are also various multistage variants, in which subregions of different size are used. For illustration, FIG. 13 represents relevant subregions for the case of a two-stage FMM variant.

Figure 13:
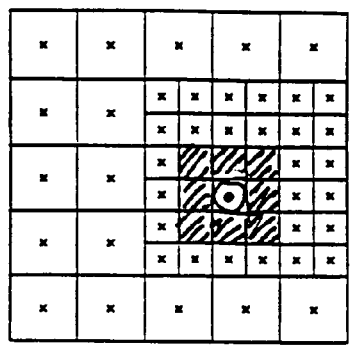
FIG. 13 shows a sketch representing the directly and indirectly coupled subregions for a two-stage FMM.

FIG. 13 represents an observer region BG of index set Fw, which is surrounded by neighboring regions NG of index set $N_w$. The neighboring regions NG are therefore directly coupled. Remote regions WEG are represented as indirect couplings with the observer region BG. Global multipole expansions GMPE are made in regions with a cross, while local multipole expansion is carried out in the observer region BG.

The size of the subregions is set in multistage FMM algorithms, preferably proportional to the distance between the observer region and the source region. The multipole expansions at the various refinement levels can be converted into one another using special translation operators, so that a complete multipole expansion is advantageously not carried out for each subregion of the hierarchic region structure.

In the dynamic case, multipole expansions of higher order are preferably carried for larger subregions.

FIG. 1 represents a block diagram containing the steps of a method for determining an electromagnetic field. In a step 1a, the global multipole expansion is carried out as described above for the body which is to be investigated and is subdivided into subregions. In a step 1b, the local multipole expansion is carried out for the body subdivided into subregions. Finally, in a step 1c, the electromagnetic field of the body is determined by superposition from the global and local multipole expansions.

The invention is not limited to the particular details of the method depicted and other modifications and applications are contemplated. Certain other changes may be made in the above described method without departing from the true spirit and scope of the invention herein involved. It is intended, therefore, that the subject matter in the above depiction shall be interpreted as illustrative and not in a limiting sense.

What is claimed is:

1. A computer-aided simulation method for determining an electromagnetic field of a body to be produced, comprising the steps of:
    for a body to be produced that contains a plurality of charges and currents, defining a plurality of subregions of the body;
    in a computer, iteratively performing in each of the plurality of subregions, a global multipole expansion, which represents an effect of charges and currents for distant points in a respective subregion of the plurality of subregions in the multipole expansion, and a local multipole expansion, which represents an effect of charges and currents at points inside the respective subregions of the plurality of subregions in a multipole expansion, until an error measure is of a predetermined size, in a last interaction, by defining a vector I representing a current distribution in the body and initially setting I=0 and changing I in steps in successive iterations, each iteration comprising;
    a) calculating the global multipole expansion with global multipole coefficients according to $c^g = GI$, $c^g$ being a vector composed of the global multipole coefficients of the plurality of subregions,
    G being a matrix determining the global multipole coefficients in a respective subregion of the plurality of subregions for the given current distribution I;
    b) calculating the local multipole expansion with local multipole coefficients according to $c^g = Tc^g$, $c^g$ being a vector composed of the local multipole coefficients of the plurality of subregions,
    T being a translation matrix through which the global multipoles are combined into local multipoles;
    c) determining the electromagnetic field from $ZI = Z'I + Lc^l$, Z denoting an impedance matrix,
    Z' denoting a part of the impedance matrix Z, representing coupling between the subregions, Z' comprising an impedance of an element that is a component of the subregion of the body,
    L denoting a matrix for evaluating the local multipole coefficients;
    determining the electromagnetic field of the body by superposition using the global multipole expansion and the local multipole expansion of the plurality of subregions from the last iteration;
    using the determined electromagnetic field of the body to assess electromagnetic compatibility of the body with an environment of the body; and
    if said electromagnetic compatibility is satisfactory, producing the body according to all values in said last iteration.

2. The method according to claim 1, wherein the subregions are of equal size.

3. The method according to claim 1, wherein a size of the subregions is proportional to a distance from an observer region.

4. The method according to claim 1, wherein each subregion of the plurality of subregions is respectively assigned to a zone with uniform physical attribute.

5. The method according to claim 1, wherein a respective subregion of the plurality of subregions is split up to eight zones.

6. The method according to claim 1, wherein the electromagnetic field is determined for predetermined frequencies.

7. The method according to claim 6, wherein the predetermined frequencies are determined by a minimum frequency and by a maximum frequency, the method being started at the minimum frequency and the electromagnetic field being determined for each frequency, continuing as far as the maximum frequency, with a predetermined step size.

8. The method according to claim 6, wherein the predetermined frequencies are determined by a minimum frequency and by a maximum frequency, the method of being started at the maximum frequency and the electromagnetic field being determined for each frequency, continuing as far as the minimum frequency, with a predetermined step size.

9. The method according to claim 6, in which the predetermined frequencies are determined by a minimum frequency and by a maximum frequency, the method being started at a frequency between the minimum frequency and the maximum frequency, and the electromagnetic field being determined for each frequency, continuing as far as one of the maximum frequency or the minimum frequency, with a predetermined step size.

10. The method according to claim 1, wherein a stability of said method at low frequencies expected in said environment is ensured by carrying the global multipole expansions using elements.

11. A computer-aided simulation method for determining an electromagnetic field of a body which has a plurality of subregions and contains a plurality of charges and currents, comprising the steps of:

for a body to be produced that contains a plurality of charges and currents, defining a plurality of subregions of the body;

in a computer, iteratively performing, for predetermined frequencies, in each of the plurality of subregions, a global multipole expansion, which represents an effect of charges and currents for distance points in a respective subregion of the plurality of subregions in a multipole expansion, and a local multipole expansion, which represents an effects of charges and currents at points inside the respective subregions of the plurality of subregions in a multipole expansion, until an error measure is of a predetermined size, in a last interaction, by defining a vector I representing a current distribution in the body and initially setting I=0 and changing I in steps in successive iterations, each iteration comprising;

a) calculating the global multipole expansion with global multipole coefficients according to $$c^g = GI,$$

$c^g$ being a vector composed of the global multipole coefficients of the plurality of subregions, G being a matrix determining the global multipole coefficients in a respective subregion of the plurality of subregions for the given current distribution I;

b) calculating the local multipole expansion with local multipole coefficients according to $$c^g = Tc^g,$$

$c^g$ being a vector composed of the local multipole coefficients of the plurality of subregions, T being a translation matrix through which the global multipoles are combined into local multipoles;

c) determining the electromagnetic field from $$ZI = Z'I + Lc^l,$$

Z denoting an impedance matrix,

Z' denoting a part of the impedance matrix Z, representing coupling between the subregions, Z' comprising an impedance of an element that is a component of the subregion of the body, L denoting a matrix for evaluating the local multipole coefficients;

determining the electromagnetic field of the body for the predetermined frequencies by superposition using the global multipole expansion and the local multipole expansion for the plurality of subregions from the last iteration;

using the determined electromagnetic field of the body to assess electromagnetic compatibility of the body with an environment of the body; and if said electromagnetic compatibility is satisfactory, producing the body according to all values in said last iteration.

12. The method according to claim 11, wherein the predetermined frequencies are determined by a minimum frequency and by a maximum frequency, the method being started at the minimum frequency and the electromagnetic field being determined for each frequency, continuing as far as the maximum frequency, with a predetermined step size.

13. The method according to claim 11, wherein the predetermined frequencies are determined by a minimum frequency and by a maximum frequency, the method being started at the maximum frequency and the electromagnetic field being determined for each frequency, continuing as far as the minimum frequency, with a predeterminable step size.

14. The method according to claim 11, in which the predetermined frequencies are determined by a minimum frequency, and a maximum frequency, the method being started at a frequency between the minimum frequency and the maximum frequency, and the electromagnetic field being determined for each frequency, continuing as far as one of the maximum frequency or the minimum frequency with a predetermined step size.

15. A computer aided simulation method for determining an electromagnetic field of a body, comprising the steps of:

for a body to be produced that contains a plurality of charges and currents, defining a plurality of subregions of the body;

splitting each subregion of the plurality of subregions into a predetermined number of zones in the range of 2 to 8 zones;

in a computer, iteratively performing, in each of the plurality of subregions, a global multipole expansion using elements for low-frequency stability, the expansion representing, an effect of charges and currents for distant points in a respective subregion of the plurality of subregions in a multipole expansion, and a local multiple expansion, which represents an effect of charges and currents at points inside the respective subregions of the plurality of subregions in a multipole expansion until an error measure is of a predetermined size, in a last interaction, by defining a vector I representing a current distribution in the body and initially setting I=0 and changing I in steps in successive iterations, each iteration comprising;

a) calculating the global multipole expansion with global multipole coefficients according to $$c^g = GI,$$

$c^g$ being a vector composed of the global multipole coefficients of the plurality of subregions, G being a matrix determining the global multipole coefficients in a respective subregion of the plurality of subregions for the given current distribution I;

b) calculating the local multipole expansion with local multipole coefficients according to $$c^g = Tc^g,$$

$c^g$ being a vector composed of the local multipole coefficients of the plurality of subregions, T being a translation matrix through which the global multipoles are combined into local multipoles;

c) determining the electromagnetic field from $$ZI = Z'I + Lc^l,$$

Z' denoting an impedance matrix,

Z' denoting a part of the impedance matrix Z, representing coupling between the subregions, Z' comprising an impedance of an element that is a component of the subregion of the body, L denoting a matrix for evaluating the local multipole coefficients;

determining the electromagnetic field of the body by superposition using the global multipole expansion and the local multiple expansion for the plurality of subregions from the last iteration;

using the determined electromagnetic field of the body to assess electromagnetic compatibility of the body with an environment of the body; and if said electromagnetic compatibility is satisfactory, producing the body according to all values in said last iteration.

* * * * *